(12) United States Patent
Ramalingam

(10) Patent No.: US 11,068,567 B2
(45) Date of Patent: Jul. 20, 2021

(54) SELF-OWNED AUTHENTICATION AND IDENTITY FRAMEWORK

(71) Applicant: Harsha Ramalingam, Kirkland, WA (US)

(72) Inventor: Harsha Ramalingam, Kirkland, WA (US)

( * ) Notice: Subject to any disclaimer, the term of this patent is extended or adjusted under 35 U.S.C. 154(b) by 480 days.

(21) Appl. No.: 15/803,797

(22) Filed: Nov. 5, 2017

(65) Prior Publication Data

US 2018/0349581 A1 Dec. 6, 2018

Related U.S. Application Data

(60) Provisional application No. 62/514,870, filed on Jun. 4, 2017.

(51) Int. Cl.
| | |
|---|---|
| *G06F 21/31* | (2013.01) |
| *H04L 9/32* | (2006.01) |
| *H04L 29/06* | (2006.01) |
| *H04L 9/08* | (2006.01) |

(52) U.S. Cl.
CPC ............ *G06F 21/31* (2013.01); *H04L 9/0891* (2013.01); *H04L 9/0894* (2013.01); *H04L 9/3226* (2013.01); *H04L 63/083* (2013.01); *H04L 63/0815* (2013.01); *H04L 63/0861* (2013.01); *H04L 63/10* (2013.01); *H04L 63/205* (2013.01); *H04L 2463/082* (2013.01)

(58) Field of Classification Search
CPC ... G06F 21/31; H04L 63/0815; H04L 63/083; H04L 63/082; H04L 63/205; H04L 63/0861; H04L 2463/082; H04L 9/0891; H04L 9/0894; H04L 9/3226

USPC ............................................................ 726/5
See application file for complete search history.

(56) References Cited

U.S. PATENT DOCUMENTS

| | | | |
|---|---|---|---|
| 6,182,229 B1 | 1/2001 | Nielsen | |
| 7,743,404 B1 * | 6/2010 | Deutschmann | ..... H04L 63/0815 709/225 |
| 8,166,297 B2 | 4/2012 | Headley | |
| 8,438,382 B2 | 5/2013 | Ferg et al. | |
| 8,646,060 B1 * | 2/2014 | Ben Ayed | ........... H04L 63/0853 726/9 |

(Continued)

OTHER PUBLICATIONS

NPL Search Results (Year: 2020).*

(Continued)

*Primary Examiner* — Syed A Zaidi

(74) *Attorney, Agent, or Firm* — Laurence & Phillips IP Law

(57) ABSTRACT

A user, using a user-computing device connected to a computer network, is authenticated to access a computing resource managed by a system on the computer network. The user computing device presents a user interface to prompt the user to input a value for each of a set of user-defined credentials that the user has previously defined for a SAIF server to authenticate the user to access the computer resource, thereby forming a set of input values. Modified values, each generated from and representing a corresponding one of the input values, are transmitted and validated by comparing them with corresponding modified forms of user-defined credential values stored in a memory, thereby determining whether the user is authenticated to access the computing resource on the system.

55 Claims, 23 Drawing Sheets

(56) References Cited

U.S. PATENT DOCUMENTS

| | | | |
|---|---|---|---|
| 8,656,504 B2 | 2/2014 | Lurey et al. | |
| 9,208,301 B2 | 12/2015 | Grigg et al. | |
| 9,286,450 B2 | 3/2016 | Grigg et al. | |
| 9,311,466 B2 | 4/2016 | Headley | |
| 9,344,419 B2 | 5/2016 | Ma | |
| 9,374,361 B2 | 6/2016 | Khalil et al. | |
| 9,510,169 B2 | 11/2016 | Singer et al. | |
| 2002/0010776 A1* | 1/2002 | Lerner | H04L 63/0815 709/225 |
| 2002/0114469 A1* | 8/2002 | Faccin | H04L 9/3271 380/270 |
| 2003/0163733 A1* | 8/2003 | Barriga-Caceres | G06F 21/41 726/5 |
| 2003/0163737 A1* | 8/2003 | Roskind | H04L 9/3236 726/6 |
| 2004/0233621 A1* | 11/2004 | Maeoka | G06Q 10/107 361/679.21 |
| 2005/0278778 A1 | 12/2005 | D'Agostino et al. | |
| 2006/0236325 A1* | 10/2006 | Rao | H04L 67/34 719/315 |
| 2008/0077809 A1* | 3/2008 | Hayler | G06F 12/1466 713/193 |
| 2008/0168539 A1 | 7/2008 | Stein | |
| 2010/0037046 A1* | 2/2010 | Ferg | H04L 63/08 713/155 |
| 2011/0047606 A1* | 2/2011 | Blomquist | G06F 21/41 726/7 |
| 2013/0061318 A1* | 3/2013 | Shirai | G06F 21/316 726/19 |
| 2014/0033290 A1* | 1/2014 | Tuchman | H04L 9/3226 726/7 |
| 2014/0090035 A1* | 3/2014 | Kodama | G06F 21/31 726/6 |
| 2014/0282971 A1 | 9/2014 | Gustavson et al. | |
| 2015/0227725 A1 | 8/2015 | Grigg et al. | |
| 2015/0227729 A1* | 8/2015 | Grigg | H04L 63/0823 726/7 |
| 2016/0050193 A1 | 2/2016 | Kanov et al. | |
| 2016/0103988 A1 | 4/2016 | Caron et al. | |
| 2016/0188887 A1 | 6/2016 | Ghafourifar et al. | |
| 2016/0248756 A1 | 8/2016 | Cicchitto et al. | |
| 2017/0006066 A1 | 1/2017 | Eckel | |

OTHER PUBLICATIONS

NPL Search Terms (Year: 2020).*
NPL Search Terms (Year: 2021).*
Access Your Apps Using Single Sign-On: Salesforce Identity, https://success.salesforce.com/ideaView?id=08730000000Dr5PAAS, (Feb. 14, 2018).
Keeper's Best-In-Class Security, https://keepersecurity.com/security.html, (Feb. 14, 2018).
Thoughts on 'Why a Private Key Should Not Be Stored on a Central Server', https://tutanota.com/blog/posts/private-key, (Feb. 14, 2018).
What is application access and single sign-on with Azure Active Directory?, https://docs.microsoft.com/en-us/azure/active-directory/active-directory-appssoaccess-whatis, (Feb. 14, 2018).

* cited by examiner

SELF-OWNED AUTHENTICATION AND IDENTITY FRAMEWORK

CROSS REFERENCE TO RELATED APPLICATION

This application claims priority under 35 U.S.C. § 119(e) to U.S. Provisional Patent Application No. 62/514,870, entitled "Self-Owned Authentication and Identity Framework," filed Jun. 4, 2017. The entire disclosure of that provisional patent application is incorporated by reference herein.

TECHNICAL FIELD

The field of this disclosure relates generally to computer authentication and authorization. Authentication is sometimes abbreviated as "authN," and authorization as "authZ" in this document. When used as "auth" it could be generalized to authN, authZ, or both, depending on the context.

BACKGROUND INFORMATION

Website and mobile app (application program) users rely on authentication provided by the app creator/owner, or as the "relying party" of a federated third party "auth provider" (e.g., Google®, Facebook®, Twitter®, Amazon®, etc.) enabled by the app. The credentials (authentication properties), e.g., user-ID, password, fingerprint or other biometric data, security questions, etc., are captured and maintained by these app creators or third-party (3P) auth providers (together referred to as auth parties).

There are several pain-points resulting from users having to provide this information to auth parties, including the following:

First, users lose privacy and control of their auth information to the auth party.

Second, users' authentication is confined to only the auth properties captured and used by the auth party. Since auth parties try to limit the identifying credentials they capture to minimize pain to users, this limits the strength of authN and degree to which it can be varied.

Third, users must remember their information maintained by the auth party (e.g., who did they say was their favorite teacher in school? Did they capitalize the city-name of their birth place?) Passwords are hard to remember, and strong passwords are especially hard to remember. Adding to this challenge, some sites require users to periodically change their password.

Fourth, authN properties are relatively static (e.g., if an auth party uses ID/password and security questions, this list of credentials is slow to evolve), making it easier for hackers to reuse compromised credentials over time.

Fifth, auth parties are not consistent in how well they secure their users' credentials.

Sixth, auth parties become the single point of compromise when hackers steal many users' credentials from one site.

Seventh, users often use the same credentials on many apps/sites because it is easier. This makes them vulnerable across all shared-credential apps/sites when any one is compromised.

Eighth, users are vulnerable to having their credentials be compromised to phishing scams because it is hard to distinguish phishing sites/apps from the authentic ones.

Ninth, passwords are static once they are set (i.e., the string is static).

Tenth, a user under duress can be coerced into entering or providing credentials to criminals.

Some of the embodiments described herein can at least alleviate some or all of these problems.

Overview of Disclosure

This overview is provided to introduce a selection of concepts in a simplified form that are further described later in greater detail. This overview is not intended to identify key or essential inventive concepts of the claimed subject matter, nor is it intended for determining the scope of the claimed subject matter.

This patent document discloses various methods, systems, networks, hardware, and software for improved authentication and/or authorization for computers and/or computer information. Users are in the best position to know their most unique and personal identification information and are therefore in the best position to setup and authenticate themselves. The embodiments described herein enable users to define, create, and have exclusive access to their auth properties/credentials and their values. In a sense, the user "owns" his/her authentication credential for various computing resources. Thus, the embodiments described herein are said to employ a Self-owned Authentication and Identity Framework ("SAIF"). Third-party apps, websites, sites, servers, resources and the like may define minimum requirements, but the end user can define the specific auth credentials for a third-party site. Thus, rather than having third-party sites dictate what types of auth credentials all users shall employ, each user will be able to select and define the types of auth credentials that he or she would like to employ for each of multiple third-party sites independently. For example, User A may wish to use a simple login ID and password for a social media site, but User A may wish to use a biometric property and a back-channel code for a banking or brokerage site. Moreover, User A may also have several different avatars or accounts with the same third-party app/site or with different third-party app/sites. Each of these avatars or accounts may utilize different ranges of user-selected security levels of auth credentials with the same third-party app/site or with different third-party app/sites. All of these different accounts with each third-party app/site can be maintained under a single SAIF identity or under separate SAIF identities. Finally, another User B may have different preferences for the sites she visits.

In some embodiments, a method for authenticating a user, using a user computing device connected to a computer network, to access a computing resource managed by a system on the computer network, comprises at least the following steps performed by the system: in response to a request from the user computing device to access the computing resource, calling a runtime executable code module to execute a login service, for which the user has previously established an identity and defined a set of user-defined credentials to use to authenticate the user to the system, wherein the login service: transmits information to the user computing device to cause the user computing device to present a user interface to prompt the user to input a value for each of the set of user-defined credentials that the user has previously defined for authentication by the system, thereby forming a set of input values; receives from the user computing device a set of modified values, wherein each of the modified values is generated from and represents a corresponding one of the input values; validates the set of modified values by comparing them with corresponding modified forms of user-defined credential values stored in a memory accessible to the login service; and based on validating the set of modified values, provides an indication to the system that the user has either been authenticated or not been authenticated; and in response to an indication from the login service that the user has been authenticated, permitting the user to access the computing resource as an authenticated user, or in response to an indication from the login service that the user has not been authenticated, denying the user access to the computing resource as an unauthenticated user.

In some embodiments, an apparatus for authenticating a user, using a user computing device connected to a computer network, to access a computing resource managed by a system on the computer network, comprises: a memory in which are stored modified forms of each of a set of user-defined credential values that the user has previously defined for the system to authenticate the user to the system; a processor in or associated with the system and configured to access the memory and to perform the following in response to a request from the user computing device to access the computing resource: transmit information to the user computing device to cause the user computing device to present a user interface to prompt the user to input a value for each of the set of user-defined credentials, thereby forming a set of input values; receive from the user computing device a set of modified values, wherein each of the modified values is generated from and represents a corresponding one of the input values; validate the set of modified values by comparing them with corresponding modified forms of the user-defined credential values stored in the memory; and based on validating the set of modified values, provide an indication to the system that the user has either been authenticated or not been authenticated.

In some embodiments, a method for authenticating a user, using a user computing device connected to a computer network, to access a computing resource managed by a system on the computer network, comprises at least the following steps performed by a federated server independent of the system but in communication with the system: receiving a request from the system to authenticate the user to access the computing resource; transmitting information to the user computing device to cause the user computing device to present a user interface to prompt the user to input a value for each of the set of user-defined credentials that the user has previously defined for the federated server to authenticate the user to access the computer resource, thereby forming a set of input values; receiving from the user computing device a set of modified values, wherein each of the modified values is generated from and represents a corresponding one of the input values; validating the set of modified values by comparing them with corresponding modified forms of user-defined credential values stored in a memory at and accessible to the federated server; and based on validating the set of modified values, providing an indication to the system that the user has either been authenticated or not been authenticated to access the computing resource.

In some embodiments, a federated server for authenticating a user, using a user computing device connected to a computer network, to access a computing resource managed by a system on the computer network, the federated server being independent of the system but in communication with the system, comprises: a memory in which are stored modified forms of each of a set of user-defined credential values that the user has previously defined for the federated server to authenticate the user to the system; a set of one or more communication ports by which the federated server can communicate with the system and with the user computing device; a processor in or associated with the system and configured to access the memory and to perform the following in response to a request from the system to authenticate the user to access the computing resource: transmit information to the user computing device to cause the user computing device to present a user interface to prompt the user to input a value for each of the set of user-defined credentials that the user has previously defined for the federated server to authenticate the user to access the computer resource, thereby forming a set of input values; receive from the user computing device a set of modified values, wherein each of the modified values is generated from and represents a corresponding one of the input values; validate the set of modified values by comparing them with corresponding modified forms of user-defined credential values stored in the memory; and based on validating the set of modified values, provide an indication to the system that the user has either been authenticated or not been authenticated to access the computing resource.

In some embodiments, a method for authenticating a user, using a user computing device connected to a computer network, to access a computing resource managed by a system on the computer network, comprises at least the following steps performed by a combination of a runtime executable module executing at the system and a federated server independent of the system but in communication with the system: transmitting information to the user computing device to cause the user computing device to present a user interface to prompt the user to input a value for each of the set of user-defined credentials that the user has previously defined for the federated server to authenticate the user to access the computer resource, thereby forming a set of input values; receiving from the user computing device a set of modified values, wherein each of the modified values is generated from and represents a corresponding one of the input values; and validating the set of modified values by comparing them with corresponding modified forms of user-defined credential values stored in a memory accessible to one or more of the runtime executable module and the federated server, thereby determining whether the user is authenticated to access the computing resource on the system.

In some embodiments, a non-transitory computer-readable medium on which are embedded instructions that, when executed by a runtime executable module on a computer, cause the module to authenticate a user, using a user computing device connected to a computer network, to access a computing resource managed by a system on the computer network, the instructions comprising instructions to, in response to a request from the user computing device to access the computing resource, cause the module to: transmit information to the user computing device to cause the user computing device to present a user interface to prompt the user to input a value for each of the set of user-defined credentials that the user has previously defined for authentication by the system, thereby forming a set of input values; receive from the user computing device a set of modified values, wherein each of the modified values is generated from and represents a corresponding one of the input values; validate the set of modified values by comparing them with corresponding modified forms of user-defined credential values stored in a memory accessible to the module only; and based on validating the set of modified values, provide an indication to the system that the user has either been authenticated or not been authenticated, thereby permitting the system to determine whether to allow or deny the user to access the computing resource as an authenticated user.

In some embodiments, a non-transitory computer-readable medium on which are embedded instructions that, when executed by a federated server, authenticates a user, using a user computing device connected to a computer network, to access a computing resource managed by a system on the computer network, the system independent of federated server but in communication with the federated server, the instructions comprising instructions to cause the federated server to: receive a request from the system to authenticate the user to access the computing resource; transmit information to the user computing device to cause the user computing device to present a user interface to prompt the user to input a value for each of the set of user-defined credentials that the user has previously defined for the federated server to authenticate the user to access the computer resource, thereby forming a set of input values; receive from the user computing device a set of modified values, wherein each of the modified values is generated from and represents a corresponding one of the input values; validate the set of modified values by comparing them with corresponding modified forms of user-defined credential values stored in a memory at and accessible to the federated server; and based on validating the set of modified values, provide an indication to the system that the user has either been authenticated or not been authenticated to access the computing resource.

In some embodiments, an apparatus for authenticating a user, using a user computing device connected to a computer network, to access a computing resource managed by a system on the computer network, comprises: means for storing modified forms of each of a set of user-defined credentials that the user has previously defined for the system to authenticate the user to the system; means for, in response to a request from the user computing device to access the computing resource, transmitting information to the user computing device to cause the user computing device to present a user interface to prompt the user to input a value for each of the set of user-defined credentials, thereby forming a set of input values; means for receiving from the user computing device a set of modified values, wherein each of the modified values is generated from and represents a corresponding one of the input values; means for validating the set of modified values against corresponding modified forms of the user-defined credential values stored in the means for storing; and means for, based on validating the set of modified values, providing an indication to the system that the user has either been authenticated or not been authenticated.

In some embodiments, a federated server for authenticating a user, using a user computing device connected to a computer network, to access a computing resource managed by a system on the computer network, the federated server being independent of the system but in communication with the system, comprises: means for storing modified forms of each of a set of user-defined credentials that the user has previously defined for the federated server to authenticate the user to the system; means for communicating with the system and with the user computing device; means for, in response to a request from the system to authenticate the user to access the computing resource, transmitting information to the user computing device to cause the user computing device to present a user interface to prompt the user to input a value for each of the set of user-defined credentials that the user has previously defined for the federated server to authenticate the user to access the computer resource, thereby forming a set of input values; means for receiving from the user computing device a set of modified values, wherein each of the modified values is generated from and represents a corresponding one of the input values; means for validating the set of modified values by comparing them with corresponding modified forms of user-defined credential values stored in a memory at and accessible to the federated server; and means for, based on validating the set of modified values, providing an indication to the system that the user has either been authenticated or not been authenticated to access the computing resource.

In some additional, alternative, or cumulative embodiments, the user interface provides an option to the user to login to the system using the user-defined credentials and also provides one or more options to the user to login to the system using other credentials.

In some additional, alternative, or cumulative embodiments, the one or more options to the user to login to the system using other credentials includes an option to login directly to the system by providing a value for a credential established by the system.

In some additional, alternative, or cumulative embodiments, the set of user-defined credentials comprises one or more of a login, a password, an answer to a security question, a biometric, and data transmitted to the user by an independent channel.

In some additional, alternative, or cumulative embodiments, the modified value and its corresponding input value are related by a one-way function.

In some additional, alternative, or cumulative embodiments, the modified value is transmitted over a secure encrypted channel (such as Hyper Text Transfer Protocol Secure (HTTPS)).

In some additional, alternative, or cumulative embodiments, the unmodified credential values are transmitted over a secure encrypted channel (such as HTTPS) and transformation of the credential values is done at the SAIF service before the validation step is executed at the service.

In some additional, alternative, or cumulative embodiments, the set of user-defined credentials is not known to the system outside of the login service.

In some additional, alternative, or cumulative embodiments, the set of user-defined credentials is not known to the system.

In some additional, alternative, or cumulative embodiments, memory in which the modified forms of the user-defined credential values are stored is not accessible to the system outside of the login service.

In some additional, alternative, or cumulative embodiments, the set of input values is not known to the system and not known to the login service.

In some additional, alternative, or cumulative embodiments, the relationship between a modified value and its corresponding input value is not known to the system outside of the login service.

In some additional, alternative, or cumulative embodiments, the login service, prior to transmitting information to the user computing device to cause the user computing device to present a user interface to prompt the user to input a value for each of the set of user-defined credentials that the user has previously defined for authentication by the system, further: transmits information to the user computing device to cause the user computing device to present a user interface to prompt the user to login to the login service; and authorizes the user to use the login service before prompting the user to input a value for each of the set of user-defined credentials that the user has previously defined for authentication by the system.

In some additional, alternative, or cumulative embodiments, the memory is not accessible to the system except by the processor to validate the set of modified values.

In some additional, alternative, or cumulative embodiments, the set of input values is not known to the system and not known to the processor.

In some additional, alternative, or cumulative embodiments, the relationship between a modified value and its corresponding input value is not known to the system except by the processor when validating the set of modified values.

In some additional, alternative, or cumulative embodiments, in response to receiving a request from the system to authenticate the user to access the computing resource and before transmitting information to the user computing device to cause the user computing device to present the user interface, the user is authenticated to the federated server.

In some additional, alternative, or cumulative embodiments, authenticating the user to the federated server comprises: transmitting information to the user computing device to cause the user computing device to present a user interface to prompt the user to input a value for each of one or more credentials for the federated server, thereby forming a set of federated-server-login input values; and determining whether the set of federated-server-login input values authenticate the user to the federated server.

In some additional, alternative, or cumulative embodiments, the one or more credentials for the federated server consist of a login and a password, the set of federated-server-login input values consists of a login value and a password value entered by the user, and wherein said determining whether the set of federated-server-login input values authenticate the user to the federated server comprises checking whether the login value and the password value entered by the user match values stored by the federated system.

In some additional, alternative, or cumulative embodiments, the one or more credentials for the federated server comprise a set of user-defined credentials, the set of federated-server-login input values comprise modified federated-server-login values corresponding to each of the user-defined credentials, said determining whether the set of federated-server-login input values authenticate the user to the federated server comprises comparing the modified federated-server-login values with corresponding modified forms of user-defined credential values stored in a memory at and accessible to the federated system, and wherein said determining whether the set of federated-server-login input values authenticate the user to the federated server is based on said comparing.

In some additional, alternative, or cumulative embodiments, the set of input values is not known to the system and not known to the federated server.

In some additional, alternative, or cumulative embodiments, the processor is further configured to authenticate the user to the federated server in response to receiving a request from the system to authenticate the user to access the computing resource and before transmitting information to the user computing device to cause the user computing device to present the user interface.

In some additional, alternative, or cumulative embodiments, the processor is further configured to authenticate the user to the federated server by: transmitting information to the user computing device to cause the user computing device to present a user interface to prompt the user to input a value for each of one or more credentials for the federated server, thereby forming a set of federated-server-login input values; and determining whether the set of federated-server-login input values authenticate the user to the federated server.

In some additional, alternative, or cumulative embodiments, the set of user-defined credentials is not known to the system, and wherein the set of input values is not known to the system.

As one skilled in the art will appreciate in light of this disclosure, certain embodiments may be capable of achieving certain advantages, including, in some cases, alleviating or even eliminating some or all of the ten pain points identified above. The foregoing and other advantages of various embodiments will be apparent upon reading this document.

DETAILED DESCRIPTION OF EMBODIMENTS

Overview of Embodiments

With reference to the above-listed drawings, this section describes particular embodiments and their detailed construction and operation. The embodiments described herein are merely examples, set forth by way of illustration only and not limitation. Those skilled in the art will recognize in light of the teachings herein that there are alternatives, variations and equivalents to the example embodiments described herein. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
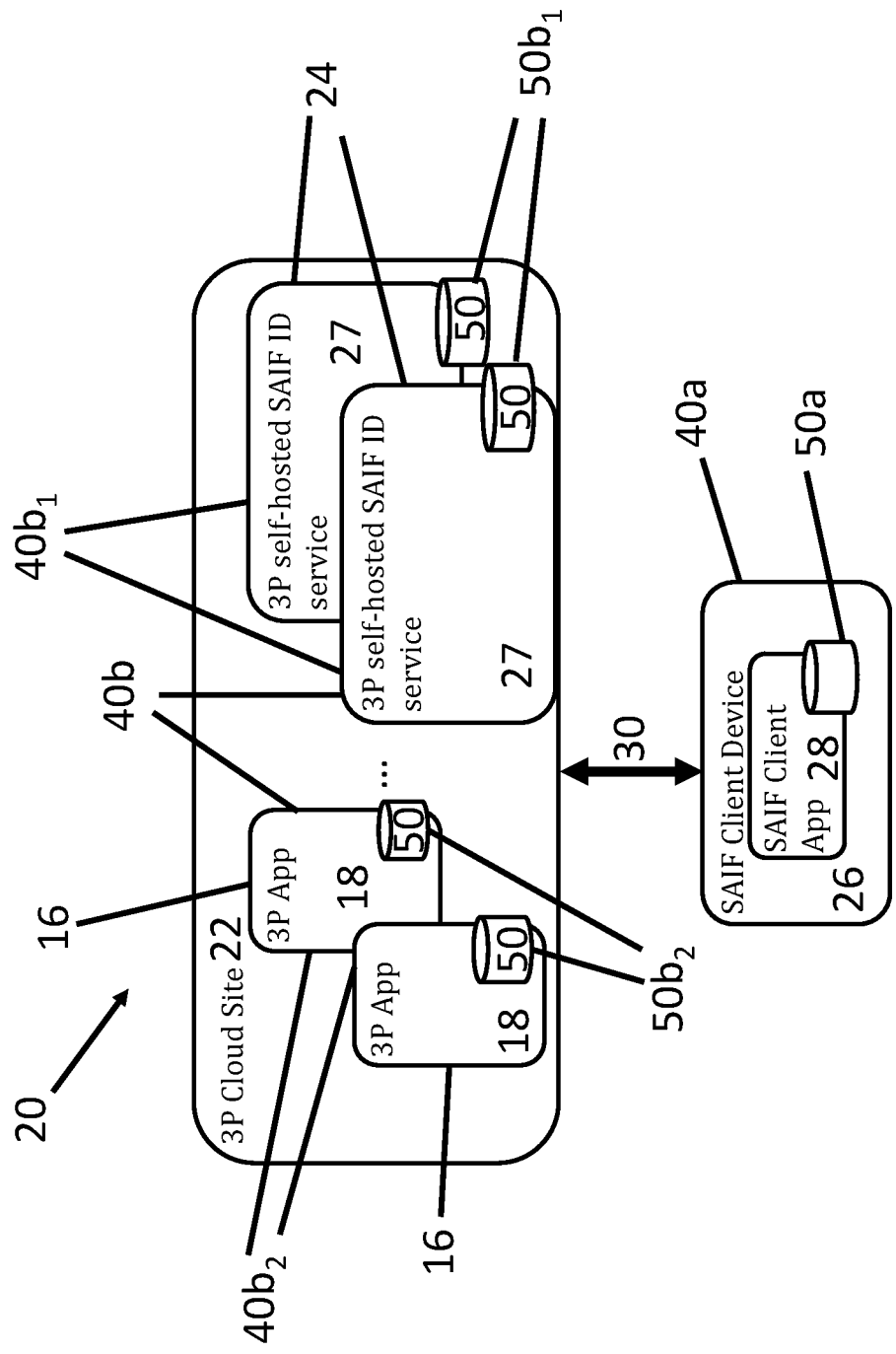
FIG. 1 is a block diagram of a first embodiment, in which a server at a third-party cloud site hosts a SAIF executable module, pursuant to a third-party-app-hosted model.

FIG. 1 is a block diagram of a first embodiment, pursuant to a third-party-app-hosted model 20 (3P-app-hosted model 20), in which a third-party cloud site 22 such as a data center or virtual private cloud hosts one or more servers 24 running a SAIF executable module 27 as a service (labeled "3P self-hosted SAIF ID service 27" in the example shown in FIG. 1). The third party cloud site 22 may also be referred to as the 3P cloud site 22, third-party site 22 or third party system 22. In some instances, the term "app/site" may be used to refer to an app, which can be an app server supporting a mobile app or a website app which is accessed using a browser. One will appreciate that the 3P cloud site 22 may include a network of multiple computer entities $40b$ (such as computer entities $40b_1$ and $40b_2$ and associated memories 50, such as memories $50b_1$ and $50b_2$), some of which host the 3P app(s) 18 (such as in a memory $50b_2$) which will use the SAIF ID service 27. In some embodiments, the computer entities $40b_1$ and $40b_2$ may be implemented in the form of respective servers 16 and 24. In some embodiments, the 3P cloud site 22 may include a computer entity 40 not owned by the third-party, and is instead owned by a web-hosting organization in which case such computer entity 40 may serve as a gateway to one or more computer entities 40 on the third-party network. In some embodiments, one or both of the servers 16 and 24, which implement respective computer entities $40b_1$ and $40b_2$, can be implemented as virtual servers.

In some examples of this embodiment, runtime executable code for the 3P self-hosted SAIF ID service 27 preferably exists at the 3P cloud site 22 (such as in a memory $50b_1$) only in executable binary form. In other words, the source code for the 3P self-hosted SAIF ID service 27 is not known to the 3P developers, and is only accessible as application program interfaces (APIs) to the 3P app(s) 18 on the third-party servers 16 at the 3P cloud site 22. The 3P app(s) 18 communicate with the 3P self-hosted SAIF ID service 27 to log in a user via a SAIF method. In such case, the 3P self-hosted SAIF ID service 27 may perform various steps or functions, which may include: (1) the 3P self-hosted SAIF ID service 27 provisions IDs; (2) the 3P self-hosted SAIF ID service 27 is the SAIF runtime implementation of the SAIF binary on the server 24; (3) the 3P self-hosted SAIF ID service 27 hosts a copy of the SAIF modified version (also referred to as modified credentials) of original user credential data (such as a copy of the original user credential data after its modification by transform functions); and (4) the 3P self-hosted SAIF ID service 27 provides optional SAIF client data backup service. In preferred embodiments, the modified credentials are encrypted when they are stored or transmitted. Encryption of the modified credentials ensures that a "man in the middle" cannot snoop on the transmitted data and spoof this data to look like a client trying to login. Encryption of conventional user credentials is standard practice, and encryption techniques are well known.

Step 1 may be performed by reaching out to a separate, independent server (such as an independent new ID server, not shown) to get a SAIF user ID for a new user.

Alternatively, in some embodiments, the 3P self-hosted SAIF ID service 27 at the 3P cloud site 22 may have a unique range of SAIF user IDs that the 3P self-hosted SAIF ID service 27 at the 3P cloud site 22 can provision without making a request to an independent new ID server. The unique range of SAIF user IDs may be universal SAIF IDs that are usable at other sites, or the unique range of SAIF user IDs may be unique to the particular 3P self-hosted SAIF ID service 27 at the particular 3P cloud site 22. In other words, the 3P self-hosted SAIF ID service 27 at the 3P cloud site 22 may be implemented by a dedicated version of SAIF that is unique to the particular 3P cloud site 22, wherein the unique range of SAIF user IDs are not universal SAIF IDs that are usable at other sites.

Figure 5:
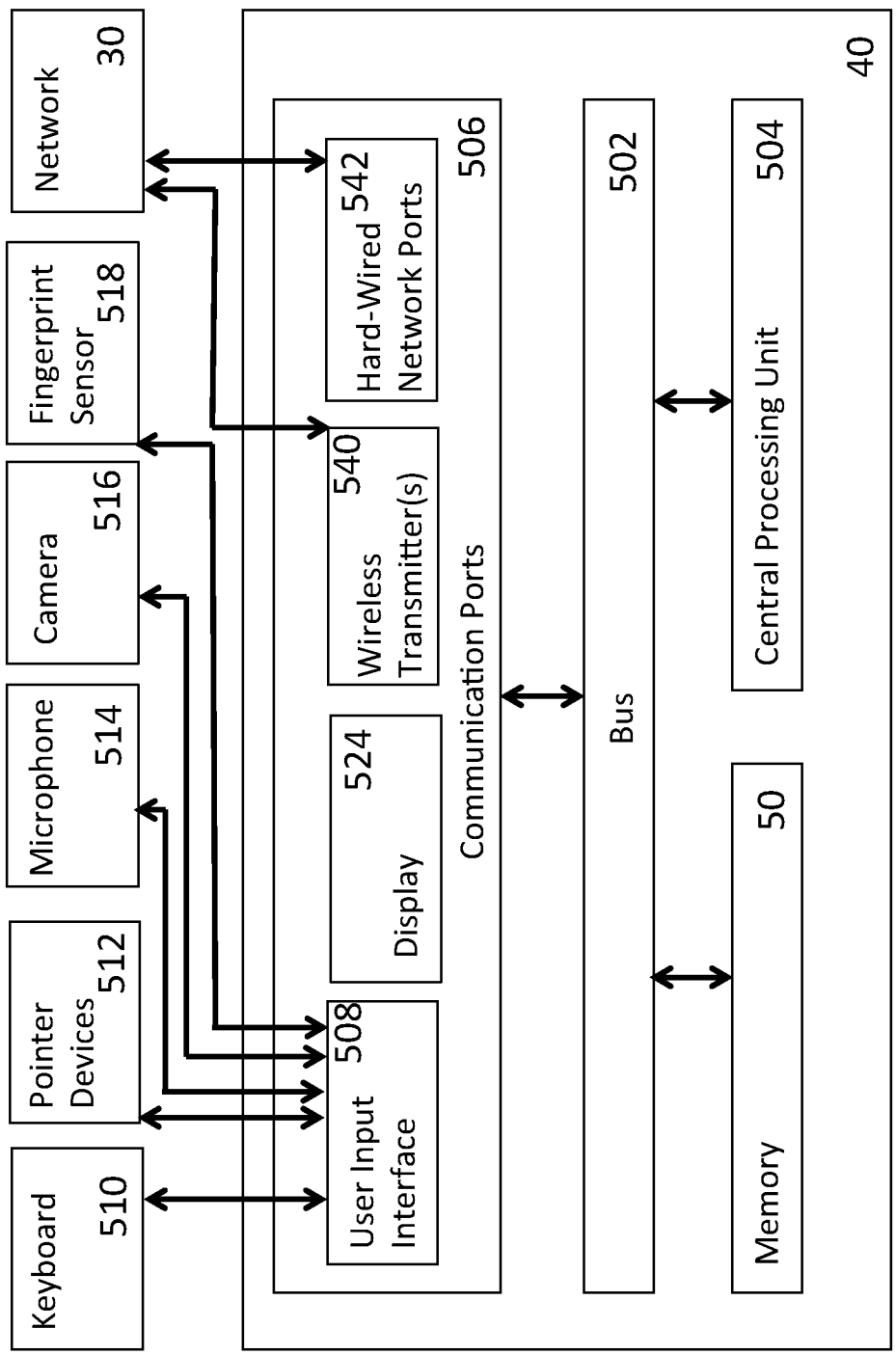
FIG. 5 is a block diagram of simplified generic computer architecture that may be employed as a computer entity, such as a SAIF client or server, in various embodiments.

With reference to FIG. 1, a SAIF client device 26 (also referred to as a user device 26) may be an end user computer entity 40a, such as, for example, a desktop computer, laptop computer, smart phone, electronic tablet, electronic pad, etc. with sufficient components and subsystems to implement protocols of the SAIF client application (SAIF client app) 28. Although only a single SAIF client device 26 is depicted, the 3P-app-hosted model 20 (or any of the other models or embodiments) may utilize any number of distinct SAIF client devices 26 that may be the same (such as two laptop computers) or different (such as a smart phone and electronic tablet). A block diagram of simplified generic computer architecture that may be employed in a SAIF client device 26 is shown in FIG. 5 and discussed later in greater detail. In the form of a SAIF client app 28, the SAIF client device 26 hosts creation, storage, and cache of SAIF client ID credential data (also called authentication properties and values). Moreover, the end user owns (i.e., creates and has exclusive access to user's authentication properties and their values) and defines specific authentication properties (also called credentials) for the 3P app 18 at the 3P cloud site 22, which may specify minimum requirements for authentication.

The SAIF client device 26 executes the SAIF client app 28, which is a software module (which may be stored in a memory 50a in some embodiments) that interfaces with a user and may communicate with the 3P app 18 when the 3P cloud site 22 is executing the 3P self-hosted SAIF ID service 27. The 3P cloud site 22 and the SAIF client device 26 are connected, typically by one or more computer networks, which may include, for example, the Internet and/or a cellular phone network. The 3P cloud site 22 and the SAIF client device 26 may communicate by any appropriate communication protocol, such as those typically employed over the Internet, such as TCP/IP.

Figure 2:
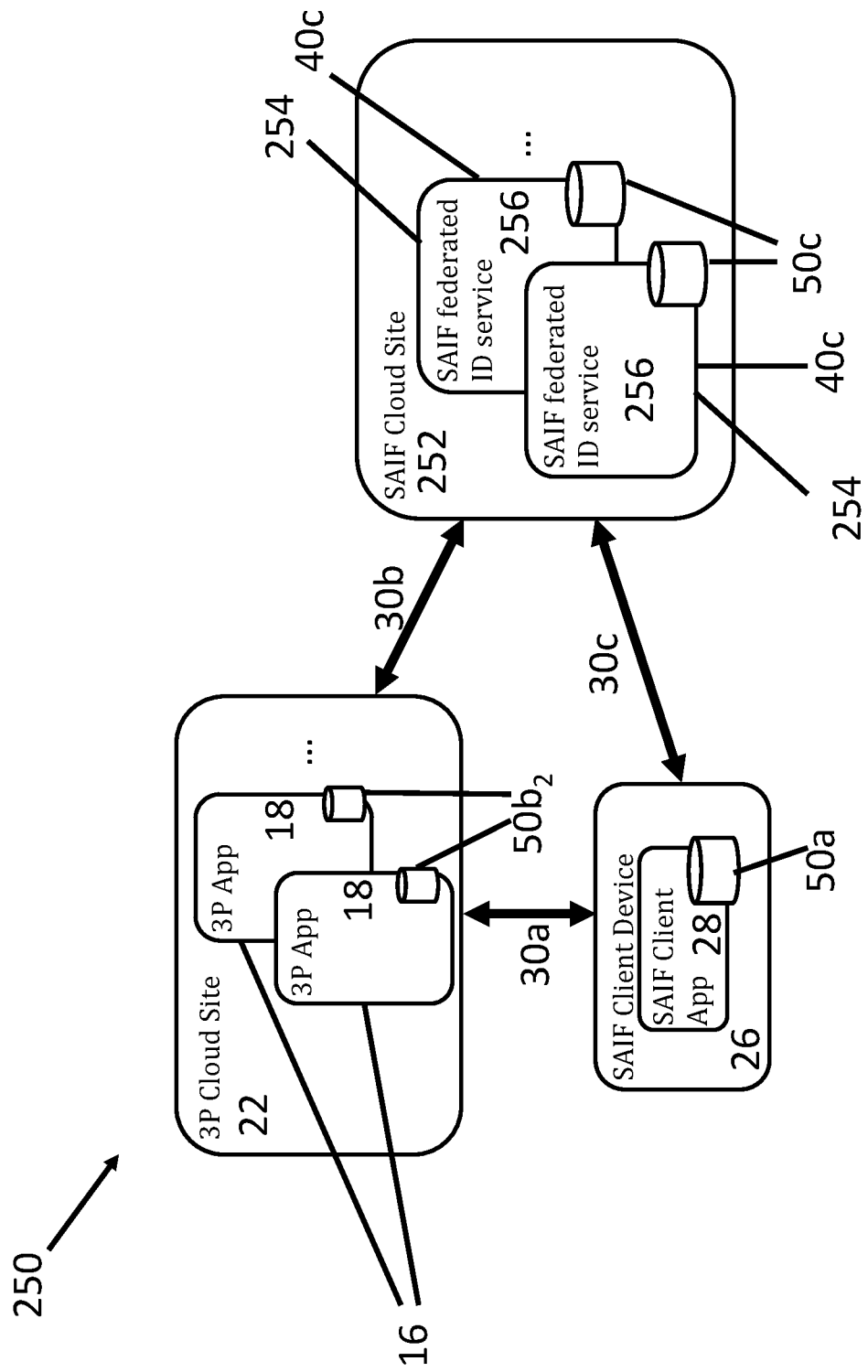
FIG. 2 is a block diagram of a second embodiment, in which a SAIF cloud site hosts a SAIF service, pursuant to a federated model.

FIG. 2 is a block diagram of a second embodiment, pursuant to a federated model 250, in which a SAIF cloud site 252 (also called SAIF site 252) hosts one or more servers 254 running the SAIF cloud app 256 (also called SAIF federated ID service 256 or SAIF cloud service 256) responsive to a 3P app 18 at a 3P cloud site 22 and the SAIF client app 28. The SAIF site 252 is independent, autonomous, and/or separated from the 3P cloud site 22 of the third-party system. Moreover, the SAIF site 252 (and some or all of its server(s) 254) may be dedicated to performing SAIF activities. The SAIF site 252 may also perform the functions of the new ID server discussed with respect to the embodiment concerning FIG. 1. One will also appreciate that the SAIF site 252 may include a single computer entity 40c or a network of multiple computer entities 40c. Moreover, the SAIF site 252 may include a computer entity 40c not owned by the SAIF but is instead owned by a web-hosting organization in which case such computer entity 40c may serve as a gateway to one or more computer entities 40c on the SAIF network.

The SAIF cloud service 256 may include a SAIF executable module of processing software and memory 50c that may include many of the same features as those of the SAIF executable module running on the server(s) 24 in the first embodiment. However, the SAIF cloud service 256 may additionally include third-party SAIF modified credentials for multiple third parties (and those for multiple users 410) as well a backup of the user's encrypted client data. This model 250 is federated because the SAIF server 254 (the SAIF ID provider) manages the login process on behalf of the 3P app 18 at the 3P cloud site 22 (the relying party), which is on the third-party server 22.

As with the first embodiment, the SAIF client device 26 executes the SAIF client app 28, which is software that interfaces with a user and communicates with the 3P app 18 on the server 16 of the 3P cloud site 22; however, as indicated in FIG. 2, the 3P cloud site 22 may call the APIs of a SAIF platform of the SAIF site 252 with federated ID service to enable federated ID authentication at the SAIF site 252. In this second, federated embodiment, the SAIF cloud service 256 at the SAIF site 252 performs various functions or steps, which may include: (1) the SAIF cloud service 256 provisions SAIF user IDs to users; (2) the SAIF cloud service 256 hosts a SAIF runtime for federated ID service; (3) the SAIF cloud service 256 hosts SAIF-transformed user credential data; and (4) the SAIF cloud service 256 provides optional SAIF client data back-up services.

The SAIF cloud service 256 may indicate authentication by, for example, sending a token to the 3P cloud site 22 if the user successfully logs in to the SAIF site 252. Such a token may be, for example, a timed (i.e., set to expire after a predetermined time) or a session (good for an entire session) token. The SAIF site 252 or one or more of its servers 254 hosting the SAIF federated ID service 256 may be dedicated exclusively to the 3P app 18 or 3P cloud site 22 of one third party, or the SAIF site 252 may be a shared resource used by the 3P apps 18 or 3P cloud sites 22 of multiple unaffiliated third parties.

As with the first embodiment, the SAIF client device 26 in the second embodiment hosts SAIF client ID data creation, storage, and cache; and, the end user owns and defines specific authentication properties for the 3P app 18 at the 3P cloud site 22.

Figure 3:
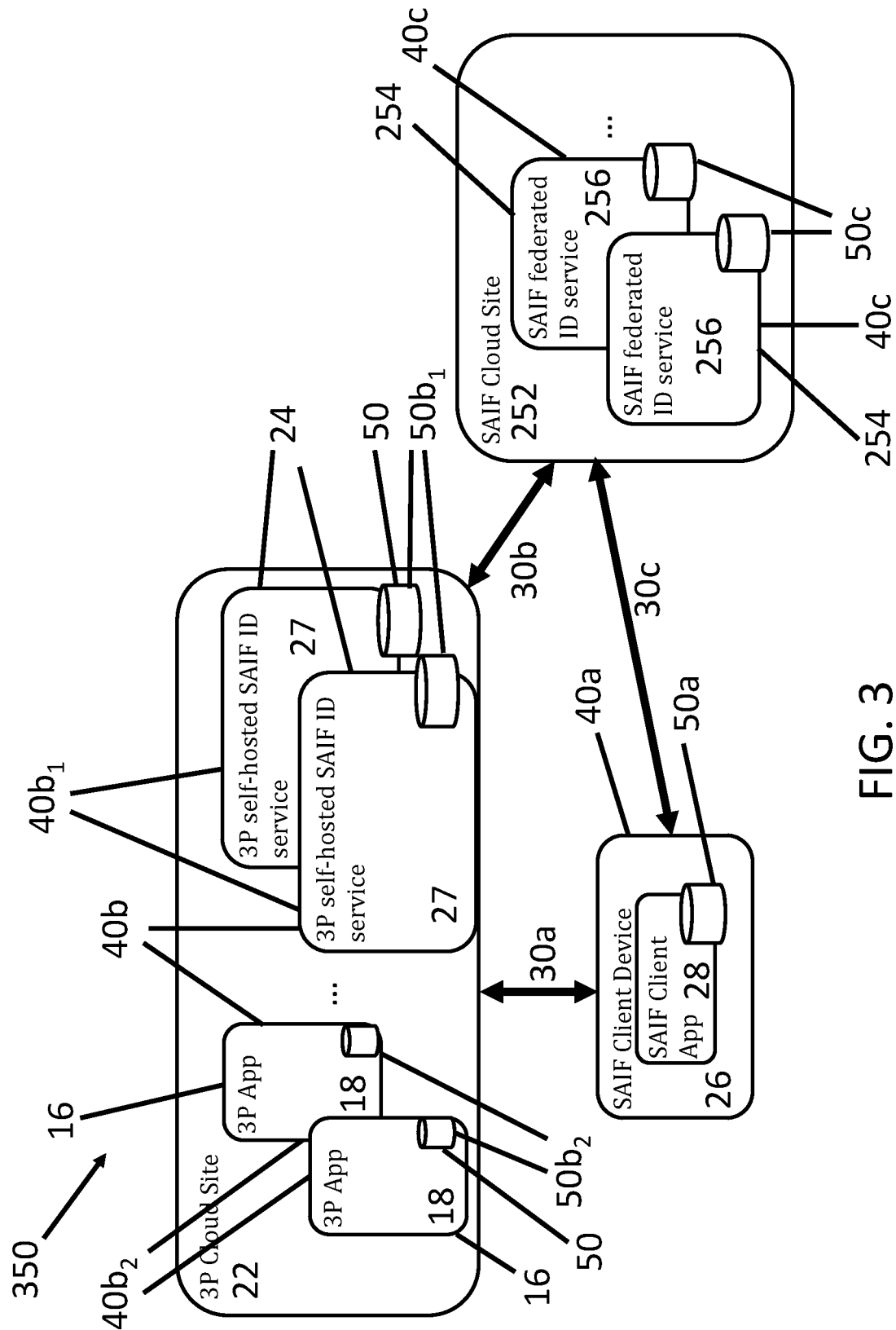
FIG. 3 is a block diagram of a third embodiment, in which a third-party cloud hosted SAIF server and a SAIF cloud hosted SAIF server share responsibilities to perform a SAIF service, pursuant to a hybrid model.

FIG. 3 is a block diagram of a third embodiment, pursuant to a hybrid model 350, in which a 3P cloud site 22 and a federated site 252 share responsibilities to perform a SAIF service. This model 350 is hybrid in the sense that, unlike the first and second embodiments, both the 3P app 18 on the third-party server 22 and the SAIF cloud site 22 with federated ID service on the SAIF site 252 each perform some of the functions associated with the authentication process. The division of functionality between the two entities can be set or adjusted as desired.

In one example of the hybrid model 350, the 3P self-hosted SAIF ID service 27 may perform various steps or functions, which may include: (1) the 3P self-hosted SAIF ID service 27 provisions SAIF user IDs; (2) the 3P self-hosted SAIF ID service 27 hosts a SAIF runtime module and optional modified credential ID data copy; (3) the 3P self-hosted SAIF ID service 27 calls SAIF platform APIs to (a) obtain SAIF IDs for provisioning and (b) retrieve modified ID data. The SAIF site 252 may perform various steps or functions, which may include: (1) the SAIF cloud service 256 provisions SAIF user IDs; (2) the SAIF cloud service 256 hosts a SAIF runtime for federated ID service; (3) the SAIF cloud service 256 hosts SAIF modified client runtime data; and (4) the SAIF cloud service 256 provides optional SAIF client data back-up service. One will appreciate again that the division of functionality between the two entities can be configured by the third-party in collaboration with the SAIF ID service provider.

As with the first and second embodiments, the SAIF client device 26 in the third embodiment hosts SAIF client ID data creation, storage, and cache; and, the end user owns and defines specific authentication properties for the 3P cloud app/site.

In general, there are three main processes to be accomplished by the SAIF client device 26, the 3P cloud site 22, and/or the SAIF site 252: (1) client setup, (2) third-party app/site setup, and (3) runtime login.

First Embodiment—Third-Party-Hosted SAIF Login Service

Figure 4:
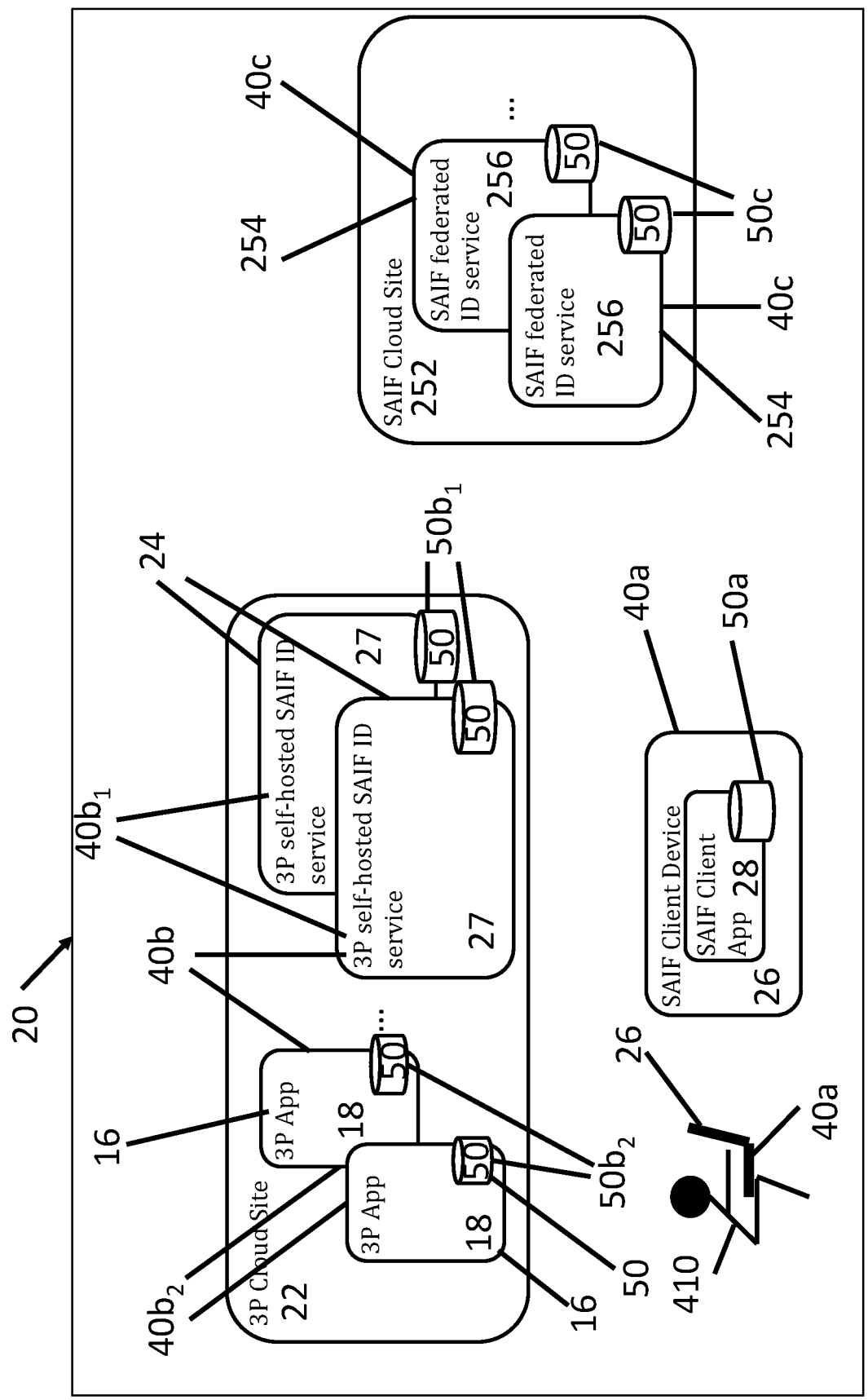
FIG. 4 is a diagram of model blocks, according to a first embodiment.

FIG. 4 is a diagram of model blocks, according to the first embodiment (i.e., the third-party hosted SAIF service model 20, such as illustrated in FIG. 1), and shows three main computer entities 40 (40a, 40b, and 40c) involved and what data may be stored at which computer entity 40. The computer entities 40a, 40b, and 40c may include, respectively: the SAIF client device 26, the third-party servers 16 and 254 running the respective 3P app 18 and SAIF ID service 27, and the SAIF server(s) 254 running SAIF federated ID service 256. FIG. 5 is a block diagram of simplified generic computer architecture that may be employed by various embodiments as a computer entity 40, and more particularly as the computer entity 40*a*, including the SAIF client device 26.

With reference to FIGS. 4 and 5, a computer entity 40, such as the SAIF client device 26 operated by a user 410, may include many of the components and subsystems typically found in an end-user computer, such as, for example, a desktop computer, laptop computer, smart phone, electronic tablet, electronic pad, etc. Some of these components and subsystems may not participate in the operation of the primary SAIF protocols of the SAIF client app 28 and may be optional and/or may be employed to implement additional features later described.

In general, the primary SAIF protocols employed by the SAIF client app 28 in the SAIF client device 26 utilize a memory 50 to store software of the SAIF client app 28 and to store encrypted original credentials. These credentials may include one or more of, and preferably two or more of, user ID, PII (Personally Identifiable Information, e.g., name, addresses, social security number, license number, passport number, etc.), personal information (e.g., date of birth, place of birth, father's or mother's information, pet's name, school, etc.), password, security questions, and biometric data, such as fingerprints, ocular-based identifiers (e.g., iris or retinal scan), voice samples, and images (e.g., facial (2D or 3D), photo, video, and artwork, and any of these without embedded code (e.g., 2DID and data matrix)). In some embodiments, SAIF may employ an AuthN Vector (AV), which can be a self-defined set of multiple identifying credentials and their values.

In some embodiments, SAIF authentication methods can be single factor or multi-factor, and can be single channel or multichannel. Examples of multi-factor authentication methods are described in U.S. Pat. Nos. 8,006,291, 8,516, 562, and 8,536,976, the detailed descriptions of all three of which are incorporated by reference herein.

Alternatively or additionally, some embodiments of SAIF may employ an "Intelligent Password," which may be specified using a simple language to algorithmically generate a password string that the creator can replicate manually. For example, Hr%$YYYY%@%mkstr($DD*2)%, could generate the password "Hr2017@50" on the 25th of any month in 2017. Another alternative is to specify a smart token generator service (e.g., like RSA tokens) that can be used by a smart phone app to provide a conforming token.

In some embodiments, the credentials of SAIF may employ a photo for facial identity for use with some entities (e.g., when a user 410 goes into a bank to establish a user's SAIF identity, the entities may want to cross check with a government issued photo-ID). This feature can also be integrated with government identity verification systems to establish a government verified user identity.

In some embodiments, SAIF may include alias IDs, e.g., Google®, Facebook®, etc., as validated identity attributes (i.e., when these alias IDs are added as attributes or credentials, they can be authenticated with the provider before being stored).

In some embodiments, SAIF may employ a method to capture credential information under the user's control (e.g., on a user-owned client device 26) for creating or updating the AV.

In some embodiments, SAIF may employ a method on the user-owned client device 26 to encrypt and store the AV locally using user-owned keys.

In some embodiments, SAIF may employ a method on the user-owned client device 26 to send a modified AV to the cloud where the credential values are substituted with their transformed values (e.g., one-way hashes). In some embodiments, SAIF may also encrypt transformed (or untransformed) credential values for storage or transmission.

In some embodiments, SAIF may employ a cloud service to provide the authentication service to SAIF clients. In some embodiments, SAIF may employ an accompanying client plug-in embedded by SAIF clients in their user interfaces to use the cloud service at AuthN time. In some embodiment, SAIF may employ cloud storage of AVs done using the service's own salting of the one-way transforms provided by the user's client component. SAIF may provide an option for cloud-based cache and device-based cache (mobile and browser) of Auth properties. Device-only cache can reduce the single point of compromise in the cloud.

In some embodiments, SAIF may employ a self-determined static or dynamic anti-phishing signature (in addition to the difficulty of a phisher to know the credential subset for the app/site).

In some embodiments, SAIF may use AI (artificial intelligence) techniques to determine the best property-sets based on the type of app/site to recommend such property-sets for inclusion by the user 410.

In some embodiments, SAIF may encapsulate the AV in a software service agent, which can be used to authenticate the user 410 automatically, e.g., on a mobile phone or using a USB thumb drive. The agent can be enabled to do this by wireless means, e.g., over Wi-Fi, NFC (near-field communication), etc. The user 410 may need to authorize the agent, and the agent could do this after user authN using any of the user's preferred authN methods. Authorization of the agent to act on the user's behalf may be set with an expiration time (e.g., agent-based auto-auth times out after an hour). Alternatively, the agent may randomly request re-authentication. One method may be to use a voice-based re-authN where the user 410 is asked to repeat a word or phrase requested by the agent.

In some embodiments, SAIF may employ a coercion indicator, which may be a pre-specified signal, e.g., a special character which when appended as the last character or otherwise included in a credential value at the time of entry into any (one or more) AuthN attribute fields indicates that the AuthN information received was sent from a coerced user, provided under duress. The coercion indicator can be used by the SAIF site/service or 3P app/site to take appropriate action, e.g., treat it as an SOS to bring help, process all following requests as null requests—not causing any harmful action such as bank transfers, purchases, or credit card charges. The feature may be provided as a plug-in.

With reference again to FIGS. 4 and 5, the memory 50, which may include a memory controller (not shown), may be connected to a bus 502 that also connects to a central processing unit (CPU) 504, which may include one or more processors or cores. The memory 50 may include one or more types of memory such as solid-state memory such as cache, RAM and/or ROM, and/or disk drives, which may be, for example, magnetic or optical. One or more of the memory units constituting the memory 50 may be volatile or non-volatile, permanent or removable, etc. Although FIG. 5 depicts a single bus 502 for simplicity of presentation, multiple buses connected by bus bridges may be employed.

With reference to FIGS. 4 and 5, the bus 502 facilitates access of program code and associated program data of the SAIF client app 28 by the CPU 504 such that computer instructions for processing can be executed. Once loaded and executed, the processing software of the SAIF client app 28 would await an input through one or more communication ports 506, including a user input interface 508. For example, after receiving input instructions, the CPU 504 may access the memory 50 to utilize the processing software to modify the credentials, such as by encryption, to create modified forms of the credentials. These modified forms of these credentials (e.g., encrypted credentials) may then be sent through the bus 502 for storage in the memory 50.

With reference again to FIG. 5, the user input interface 508 may facilitate connection to, and receipt of input from, one or more user input devices, such as a keyboard 510, a pointer device 512 (such as a mouse, stylus, laser, or eye), a microphone 514, a camera 516, or a finger print sensor 518. These user input devices may be integrated with and form part of the SAIF client device 26, or they may be external devices that are directly, individually or jointly, connected to the SAIF client device 26 through hard wired connections or wireless connections or indirectly through a local network (not shown). The user input interface 508 signals to the processing software of the SAIF client app 28 that a user 410 (FIG. 4) would like to interact with SAIF client app 28.

A display 524, such as in the form of a touch screen, (and/or one or more speakers, not shown) may also be integrated with and form part of the SAIF client device 26 or may be an external device that is directly, individually or jointly, connected to the SAIF client device 26 through a hard-wired connection or wireless connection or indirectly through the local network (not shown). For example, the display 524 may be integrated with the user input interface 508 and/or one or more of the user input devices. The display 524 may also provide information from the CPU 504, such as queries to the user 410 from the 3P app 18 (or the SAIF cloud service 256) through the network 30, which may interface with wireless transmitter(s) 540 and/or hard-wired network port(s) 542 of the communication port(s) 506 of the SAIF client device 26.

The computer entities 40b and 40c at the 3P cloud site 22 and the SAIF site 252 may include similar types of components to those employed in the SAIF client device 26. For example, these computer entities 40 will typically each include multiple communication ports 506, a bus 502, a memory 50, and a CPU 504. In many embodiments, these computer entities 40 may be more greatly adapted than the SAIF client device 26 for quickly relaying instructions and information to the network 30. Accordingly, the communication ports 506 may be more numerous or more robust to achieve this purpose, the memory 50 may include greater capacity, the bus 502 may be implemented in the form of a complex bus system or multiple buses 502, and the central processing unit 504 may include multiple and/or more powerful processors. The third-party servers 16 in the 3P cloud site 22 and the servers 254 in SAIF site 252 may have little or no use for communication ports 506 for the user input interface 508 and the display 524, so such communication ports 506 may be omitted or minimized.

In some embodiments, the memory 50 of the third-party server 16 at the 3P cloud site 22 may store the processing software of the SAIF executable module running on server 24 and provide it to the CPU 504 of the computer entity 40b to implement the 3P self-hosted SAIF ID service 27 to provide login authentication for multiple users 410. The memory 50 for the 3P self-hosted SAIF ID service 27 on the third-party server 24 at the 3P cloud site 22 may also store the modified user's credentials of multiple users 410.

In some embodiments, the memory 50 of the SAIF server 254 at the SAIF site 252 may store the processing software of the SAIF cloud service 256 and provide it to the CPU 504 of the computer entity 40c to implement a process for setting up a user 410 to use SAIF. The memory 50 of the SAIF server 254 at the SAIF site 252 may also store the modified user's credentials of multiple users 410 and may function as a backup of users' encrypted client data.

Figure 6:
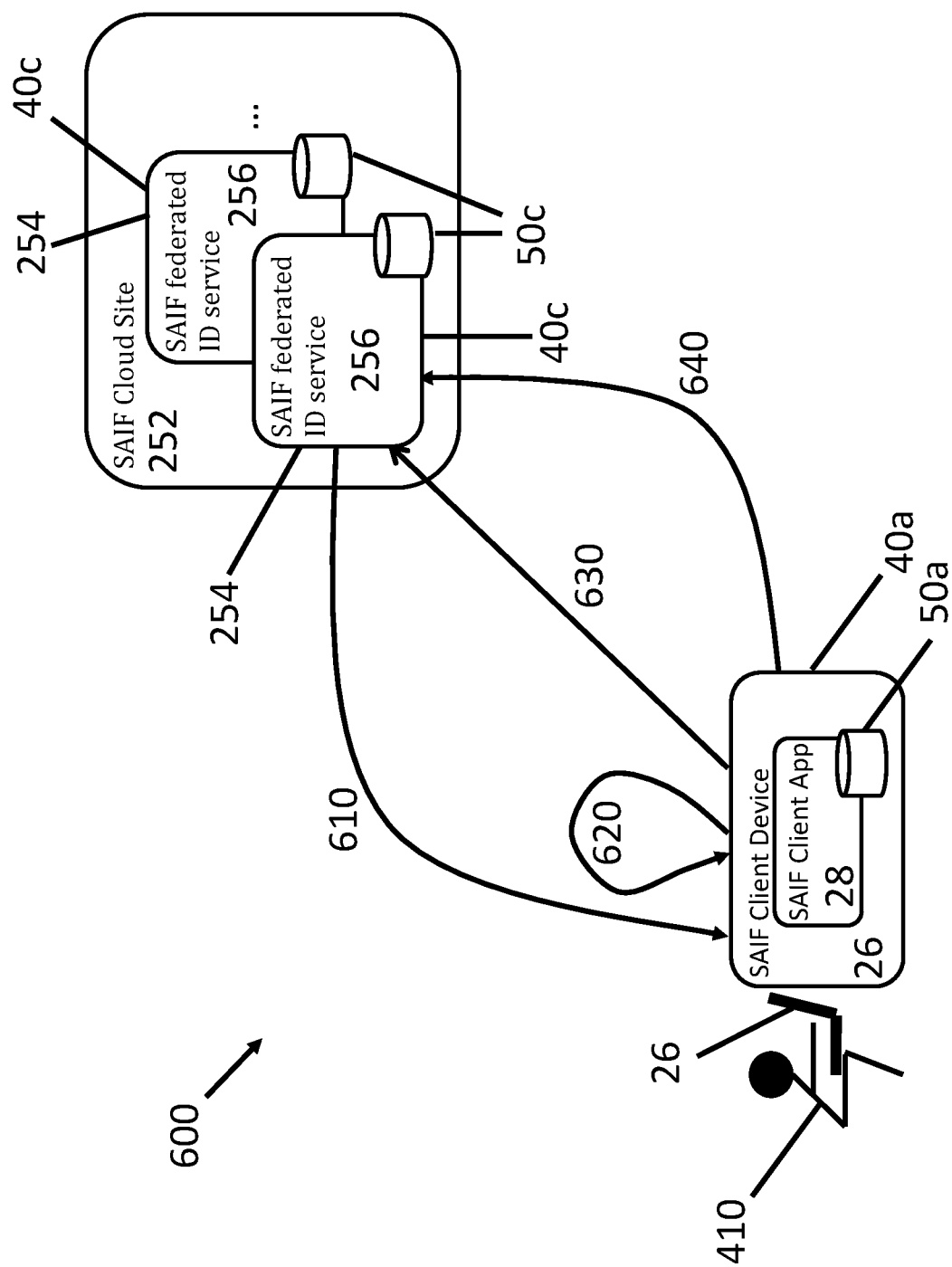
FIG. 6 is a sequence-annotated block diagram for an exemplary process for setting up a user to use SAIF, according to the first embodiment.

FIG. 6 is a sequence-annotated block diagram for an exemplary process for setting up a user 410 to use SAIF, according to the first embodiment for the 3P-app-hosted model 20. With reference to FIG. 6, as an example of a SAIF user-setup process 600 for the 3P-app-hosted model 20, client setup may entail four general steps, labeled with reference numbers 610, 620, 630, and 640, such as shown in FIG. 6, according to a first embodiment.

According to a first transaction 610, the user 410 downloads and installs the SAIF client app 28 onto her client device(s) 26. Typically one SAIF client device 26 is registered and up at a time, although in some examples multiple user devices 26 can be registered (and set up) during a single set-up session.

According to a second transaction 620, the user 410 uses the installed SAIF client app 28 on her client device 26 to set the user 410 up as a SAIF client by defining her user credential properties.

According to a third transaction 630, the user 410 uses the installed SAIF client app 28 to set up a SAIF client account, identifying and providing the properties she would like to use to authenticate herself to the SAIF client app 28 and/or the SAIF cloud service 256 on the SAIF site 252. The user credential(s) for authentication with the SAIF client app 28 and the SAIF cloud service 256 may be the same or different.

According to a fourth transaction 640, the installed SAIF client app 28 encrypts and saves her encrypted user credential properties data locally on her client device 26 and optionally with the SAIF cloud service 256 on the SAIF site 252 (such as for back up purposes). The encryption key may simply be her SAIF credentials, or it may be a different key that she chooses to provide to the SAIF client for encryption. (The SAIF client also creates a modified version of the SAIF credentials and sends these modified credentials and credential property metadata to the SAIF service for use in runtime validation of the SAIF credentials.)

Figure 7:
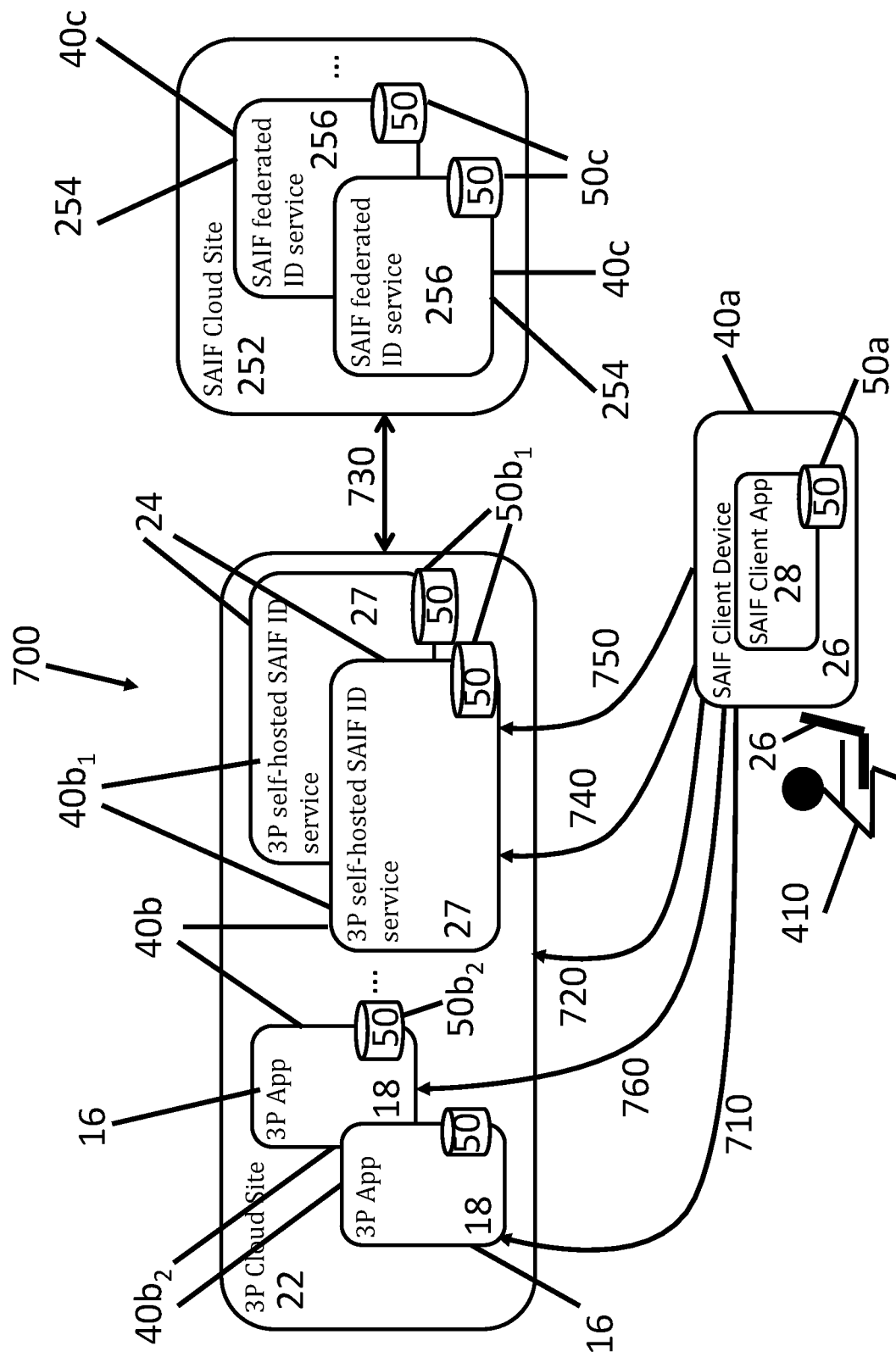
FIG. 7 is a sequence-annotated block diagram for an exemplary process for setting up a SAIF user on a third-party site, according to the first embodiment.

FIG. 7 is a sequence-annotated block diagram for a process for setting up a SAIF user 410 to use a 3P app 18 on the 3P cloud site 22, according to the first embodiment for the 3P-app-hosted model 20. With reference to FIG. 7, as an example of a SAIF user setup process 700 on the 3P app 18 on 3P cloud site 22, this user setup may entail six general steps, labeled with reference numbers 710, 720, 730, 740, 750, and 760, such as shown in FIG. 7, according to a first embodiment.

According to a first transaction 710, the user 410 requests a third-party account on the third-party app 18.

According to a second transaction 720, the user 410 is redirected by the third-party app 18 to log in to the SAIF service 27 (3P self-hosted SAIF ID service) on the 3P cloud site 22. The third-party app 18 may provide a SAIF login option (such as a designated extra user-selectable link next to a standard login field) for the 3P self-hosted SAIF ID service 27, which the user 410 may select. Alternatively, the 3P app 18 may recognize that the user 410 has the SAIF client app 28 on the client device 26 and may redirect to the SAIF service 27 (3P self-hosted SAIF ID service) to log in. For example, the SAIF client app 28 may create a cookie that will be recognized by the third-party self-hosted SAIF ID service 27 so that it may present the appropriate login credential fields for the recognized user 410 to log in.

According to a third transaction 730, the 3P self-hosted SAIF ID service 27 on the 3P cloud site 22 is synchronized with the processing software of the SAIF cloud service 256 on the SAIF server 254 to obtain a copy of modified credentials. In such examples, the synchronization permissions may be pre-authorized or the SAIF ID service 27 may request permission from the user 410. In some examples, the SAIF ID service 27 may request permission instead to synchronize with the SAIF client app 28 on the SAIF client device 26 to obtain the copy of modified credentials. However, in some preferred implementations, the SAIF cloud service is the authoritative source of modified credentials. One will appreciate that security is improved if the 3P app 18 on the 3P cloud site 22 receives only modified credentials and perhaps their metadata categories and preferably never has access to the original user properties or credentials.

According to a fourth transaction 740, the user 410 selects SAIF credentials on the SAIF client app 28 or the SAIF cloud service 256 for the third-party account. In some examples, the 3P self-hosted SAIF ID service 27 on the third-party server 24 provides the user 410 with a list of the identity properties previously setup by the user 410 with SAIF, and the user 410 selects one or more of properties to be used as credentials to log in to the 3P app 18. The 3P self-hosted SAIF ID service 27 may inform the user 410 if the selected credentials are weak or do not meet third-party minimum criteria for login to the 3P app 18.

According to a fifth transaction 750, the user 410 logs into the third-party account at the 3P app 18 at the 3P cloud site 22 by way of the user-selected credentials through the 3P self-hosted SAIF ID service 27. One will appreciate that only modified versions of the original credentials are sent to the 3P self-hosted SAIF ID service 27, as later described.

According to a sixth transaction 760, the user 410 completes remaining aspects of setup of the third-party account at the 3P app 18. For example, the user 410 may be requested to provide contact and billing information and/or answer questions about preferences. In some examples, the SAIF client app 28 on the SAIF client device 26 may assist in filling in fields requesting standard information. Upon completion of the third-party account setup, the user 410 may be granted access to the resources associated with the third-party account.

Figure 8:
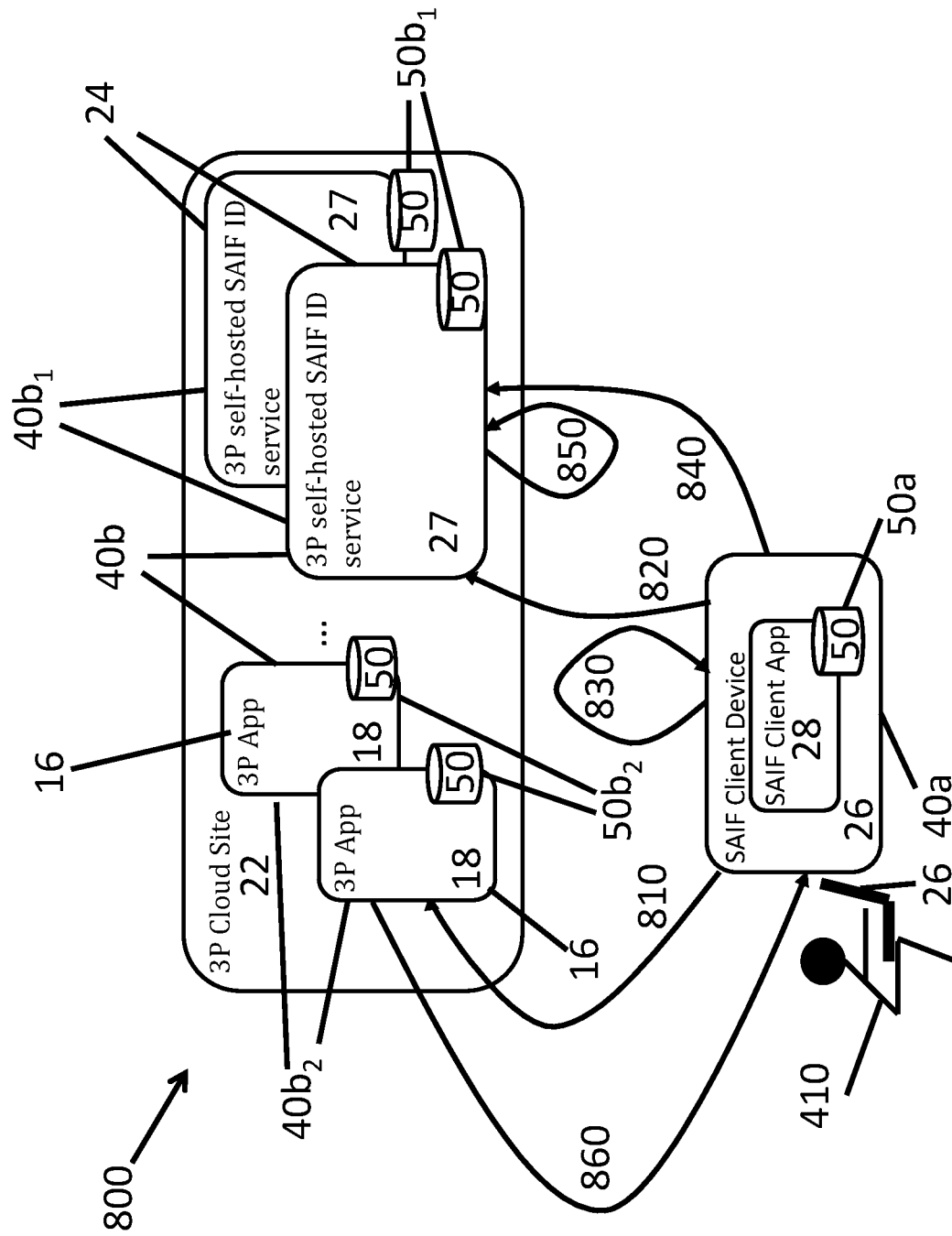
FIG. 8 is a sequence-annotated block diagram for an exemplary process for logging in a SAIF user on a third-party site, according to the first embodiment.
Figure 9:
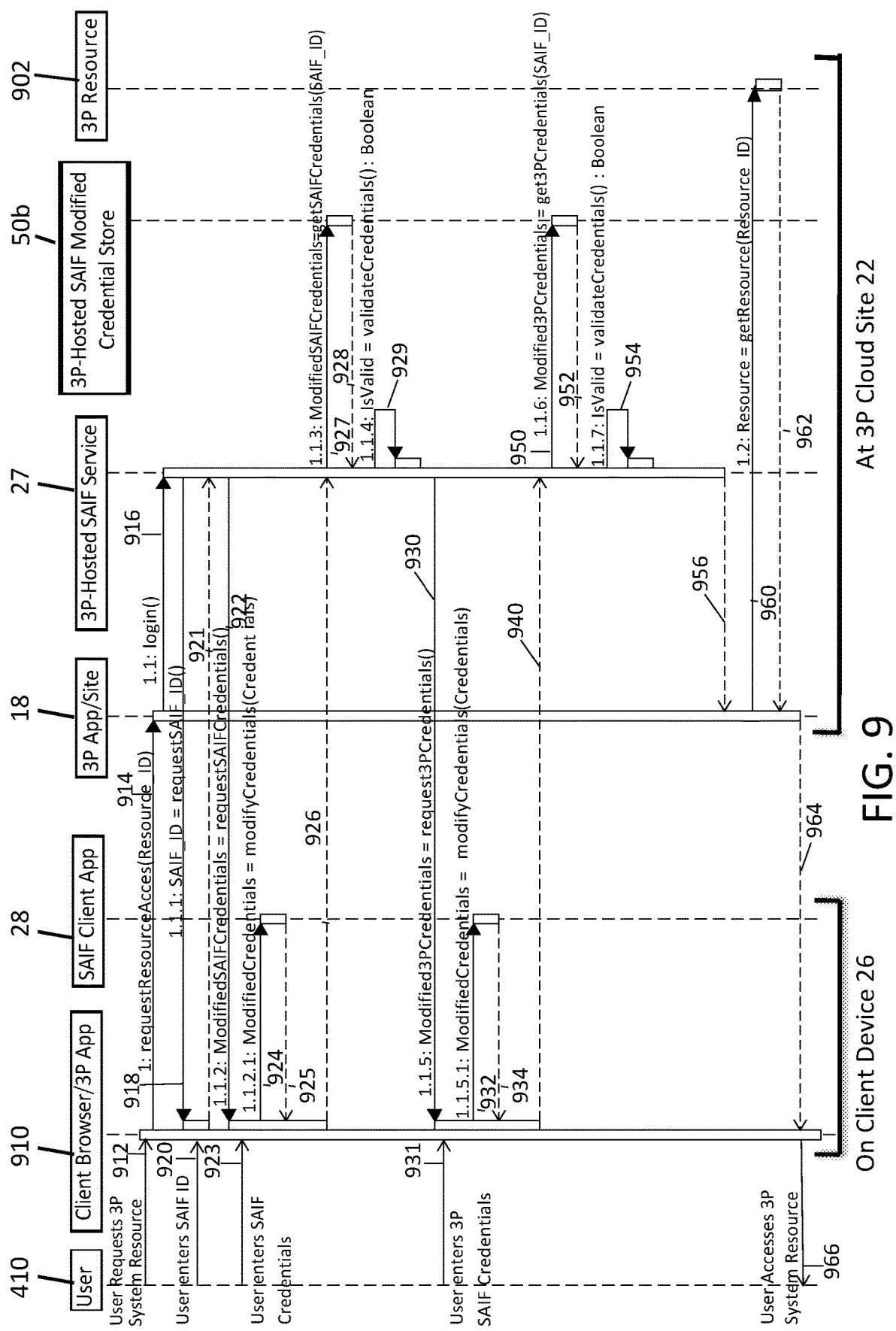
FIG. 9 is a sequence diagram for an exemplary process for logging in a SAIF user on a third-party site, according to a first embodiment.

FIG. 8 is a sequence-annotated block diagram for a SAIF-user third-party login process 800 for logging in a SAIF user 410 on a third-party site or server 22, according to the first embodiment, and FIG. 9 is a sequence diagram for the SAIF-user third-party login process 800, according to a first embodiment. In FIG. 9, time advances vertically in the downward direction, and the arrows indicate transmission and reception of requests, data, etc.

One will appreciate that the SAIF cloud service 256 on the SAIF site 252 need not be involved for this example of a SAIF-user third-party login process 800. With reference to FIGS. 8 and 9, as an example of the SAIF-user third-party login process 800 on the 3P self-hosted SAIF ID service 27, the runtime login process may entail six general steps, labeled with reference numbers 810, 820, 830, 840, 850, and 860, such as shown in FIG. 8, according to a first embodiment.

According to a first transaction 810, the user 410 requests resource(s) 902 of, or access to, a third-party account on the 3P cloud site 22. FIG. 9 provides an example of several substeps, which may not be readily apparent to the user 410, implemented by processing software of the SAIF client device 26 and/or by third-party software and/or by SAIF processing software of the 3P self-hosted SAIF ID service 27. In particular, a substep 912 shows that the user request may be initiated from the user 410 to a client browser 910 for the third-party application. In substep 914, this request is conveyed to the 3P app 18. In substep 916, the 3P app 18 forwards the request to the 3P self-hosted SAIF ID service 27. In substep 918, the 3P self-hosted SAIF ID service 27 prompts the client browser 910 for the user 410 to log into SAIF.

According to a second transaction 820, the user 410 logs in to the 3P self-hosted SAIF ID service 27 on the 3P cloud site 22. As indicated in step 920 in FIG. 9, the SAIF login step 820 may include input of the user SAIF ID on the SAIF client device 26. The SAIF login step 820 may also include an optional substep 921 of conveyance of the user SAIF ID to the SAIF ID service 27. In a substep 922, the SAIF ID service 27 prompts the client browser to have the user 410 enter the user SAIF credentials for the SAIF processing software (effectively the user password for SAIF). In a substep 923, the user enters the user SAIF credentials into the SAIF client browser/app for authentication of the SAIF user to the SAIF ID service 27. In a substep 924, the client browser/app 910 conveys these credentials to the SAIF client app 28, which associates the user SAIF credentials with corresponding modified user SAIF credentials or which converts the user SAIF credentials to corresponding modified user SAIF credentials. In an optional substep 925, the SAIF client app 28 conveys the modified user SAIF credentials to the client browser 910, which in turn conveys the modified user SAIF credentials to the SAIF ID service 27 in optional substep 926. In a substep 927, the SAIF executable module 24 checks with its memory 50b to retrieve the modified user SAIF credentials associated with the user SAIF ID. In an optional substep 928, the memory 50b presents the modified user SAIF credentials to the CPU 504 for running the processing software of the SAIF ID service 27. In a substep 929, the SAIF ID service 27 through use of the associated CPU 504 compares the modified user SAIF credentials from the user 410 to the modified user SAIF credentials from the memory 50b and validates or invalidates the user 410 based on the results of the comparison. If validation is successful, the SAIF ID service 27, in a substep 930, prompts the user 410 through the client browser 910 to provide third-party SAIF credentials for access to the third-party account. One will appreciate that this SAIF login step 820 (and most of the associated substeps) may be omitted if the user 410 has already logged into the SAIF client app 28 on the SAIF client device 26 with the help of a persistent login protocol for SAIF. Such a persistent login protocol may be implemented for example by the SAIF ID service granting the client a persistent token at its initial SAIF login, and this token may be valid for a period of time beyond which it would time out and invalidate the token. During the time that the token is valid, the client software, when needing to interact with the SAIF ID service, may present the token to the SAIF ID service, and the service, after validating the token, may honor the token and eliminate the optional SAIF user login substeps under step 820, described above.

According to a third transaction 830, the user 410 enters the SAIF credentials for the third-party account. A substep 931 shows that the user enters the third-party SAIF credentials on the SAIF Client Device 26 at the client browser 910. In a substep 932, the client browser 910 conveys these credentials to the SAIF client app 28, which associates the third-party SAIF credentials with corresponding third-party SAIF modified credentials or which converts the third-party SAIF credentials to corresponding modified third-party SAIF credentials. In an optional substep 934, the third-party SAIF modified credentials are conveyed back to the client browser 910.

According to a fourth transaction 840, the SAIF client app 28 sends the modified credentials (corresponding to the entered credentials) to the SAIF ID service 27 on the 3P cloud site 22. In a substep 940, third-party SAIF modified credentials are conveyed from the browser 910 to the SAIF ID service 27.

According to a fifth transaction 850, the SAIF ID service 27 on the 3P cloud site 22 validates the modified credentials. In a substep 950, the SAIF executable module 24 checks with its memory 50b to retrieve the third-party SAIF modified credentials associated with the user SAIF ID. In an optional substep 952, the memory 50b presents the third-party SAIF modified credentials to the CPU 504 for running the processing software of the SAIF ID service 27. In a substep 954, the SAIF executable module 24 through use of the associated CPU 504 compares the third-party SAIF modified credentials from the user 410 to the third-party SAIF modified credentials from the memory 50b and validates or invalidates the user 410 based on the results of the comparison. In a substep 956, the SAIF executable module 24 conveys the results of the validation step 850 to the 3P app 18 and redirects the transaction back to 3P app 18.

According to a sixth transaction 860, the third-party account through the 3P app 18 displays or grants access to requested resources 902 associated with the third-party account. In a substep 960, the 3P app 18 requests data from resource 902 associated with the third-party account, and in a substep 962, the resource 902 conveys the data from the requested resource 902 to the 3P app 18. In a substep 964, the requested resource data is conveyed from the 3P app 18 to the client browser 910, and the requested resource data is then available to the user 410, as shown in a substep 966. One will note again that the SAIF cloud service 256 on the SAIF site 252 need not be involved for this example of a SAIF-user third-party login process 800.

Second Embodiment—Federated SAIF Server

Figure 10:
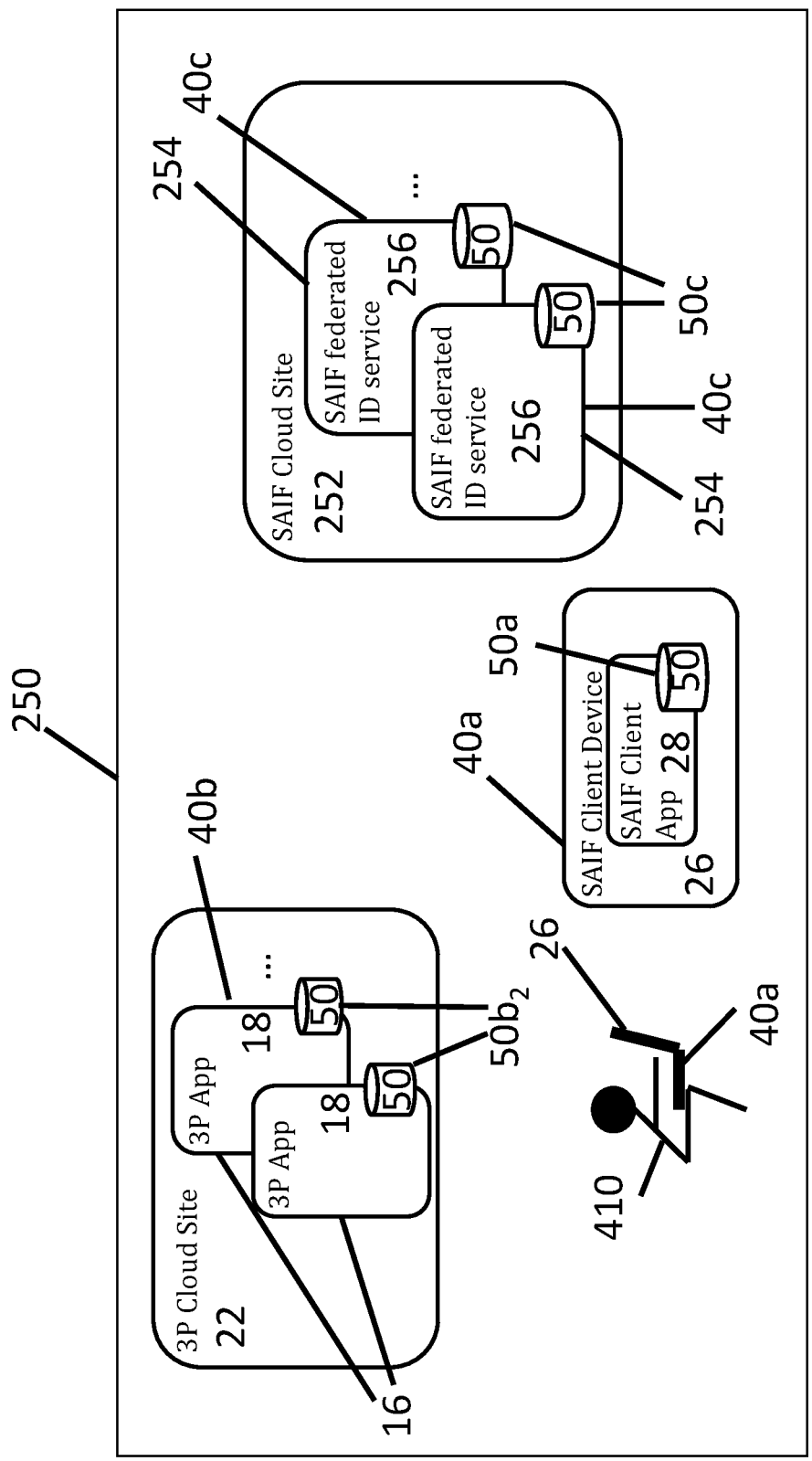
FIG. 10 is a diagram of model blocks, according to a second embodiment.

FIG. 10 is a diagram of model blocks, according to the second embodiment. i.e., the federated model 250 (such as the one illustrated in FIG. 2), and shows three main computer entities 40 involved and what data may be stored at which computer of the computer entities 40a, 40b, and 40c. The computer entities 40 may include components that are the same as, or different from, those of the computer entities 40 described with respect to FIGS. 4 and 5.

In some examples, the memory 50 of the SAIF client device 26 stores software of the SAIF client app 28 and stores encrypted original credentials of the user 410. In some examples, the memory 50 of the servers 254 at the SAIF site 252 stores the processing software of the SAIF federated ID service 256 and provides it to the CPU 504 of the computer entity 40c. The memory 50 of the SAIF servers 254 at the SAIF site 252 may also store the user SAIF modified credentials and the third-party SAIF modified credentials of multiple users 410 and may function as a backup of users' encrypted client data.

One main difference between the federated model 250 and the third-party-app-hosted model 20 is that the 3P cloud site 22 may omit being host to the login service of the SAIF ID service 27, and therefore the 3P cloud site 22 would not store the third-party SAIF modified credentials that are used for validation.

Figure 11:
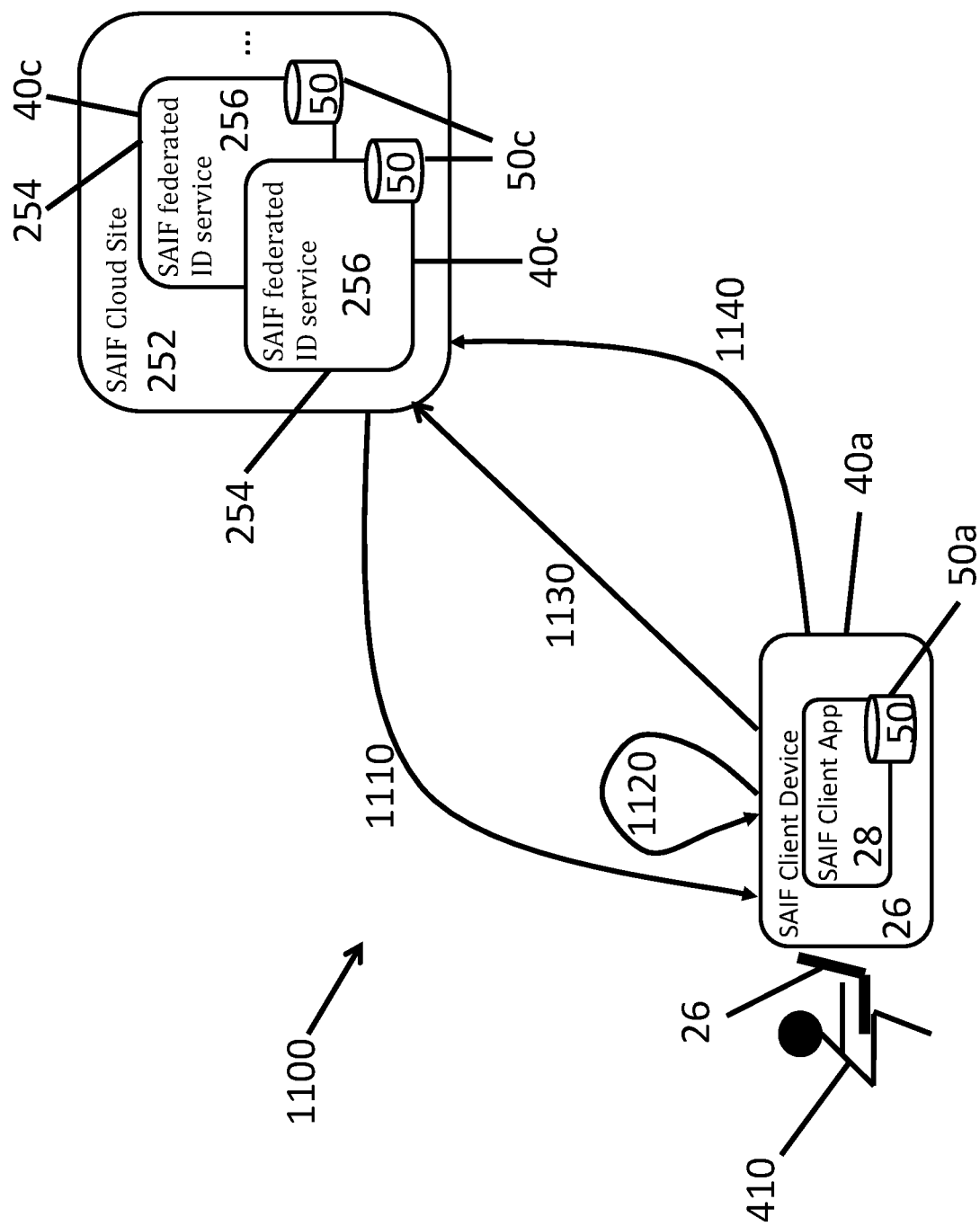
FIG. 11 is a sequence-annotated block diagram for an exemplary process for setting up a user to use SAIF, according to the second embodiment.

FIG. 11 is a sequence-annotated block diagram for an exemplary process for setting up a user 410 to use SAIF, according to the second embodiment. With reference to FIG. 11, as an example of a SAIF user setup (externally-hosted SAIF) process 1100, client setup may entail four general steps, labeled with reference numbers 1110, 1120, 1130, and 1140, such as shown in FIG. 11, according to a second embodiment.

According to a first transaction 1110, the user 410 downloads and installs the SAIF client app 28 onto her client device(s) 26.

According to a second transaction 1120, the user 410 uses the installed SAIF client app 28 on her client device 26 to set the user 410 up as a SAIF client by defining her user credential properties.

According to a third transaction 1130, the user 410 uses the installed SAIF client app 28 to set up a SAIF client account identifying and providing the properties she would like to use to authenticate herself to the SAIF client app 28 and/or the SAIF federated ID service 256.

According to a fourth transaction 1140, the installed SAIF client app 28 encrypts and saves her encrypted user data locally on her client device 26 and optionally with the SAIF federated ID service 256 (such as for backup purposes). (The SAIF client also creates a modified version of the SAIF credentials and sends these modified credentials and credential property metadata to the SAIF service for use in runtime validation of the SAIF credentials.) One will appreciate that, from the user's perspective, the SAIF client setup may be identical regardless of whether the client setup is used in conjunction with the third-party-app-hosted model 20 (wherein the SAIF login is internally hosted by the third-party server 22) or the federated model 250 (wherein the SAIF login is externally hosted by the SAIF site 252).

Figure 12:
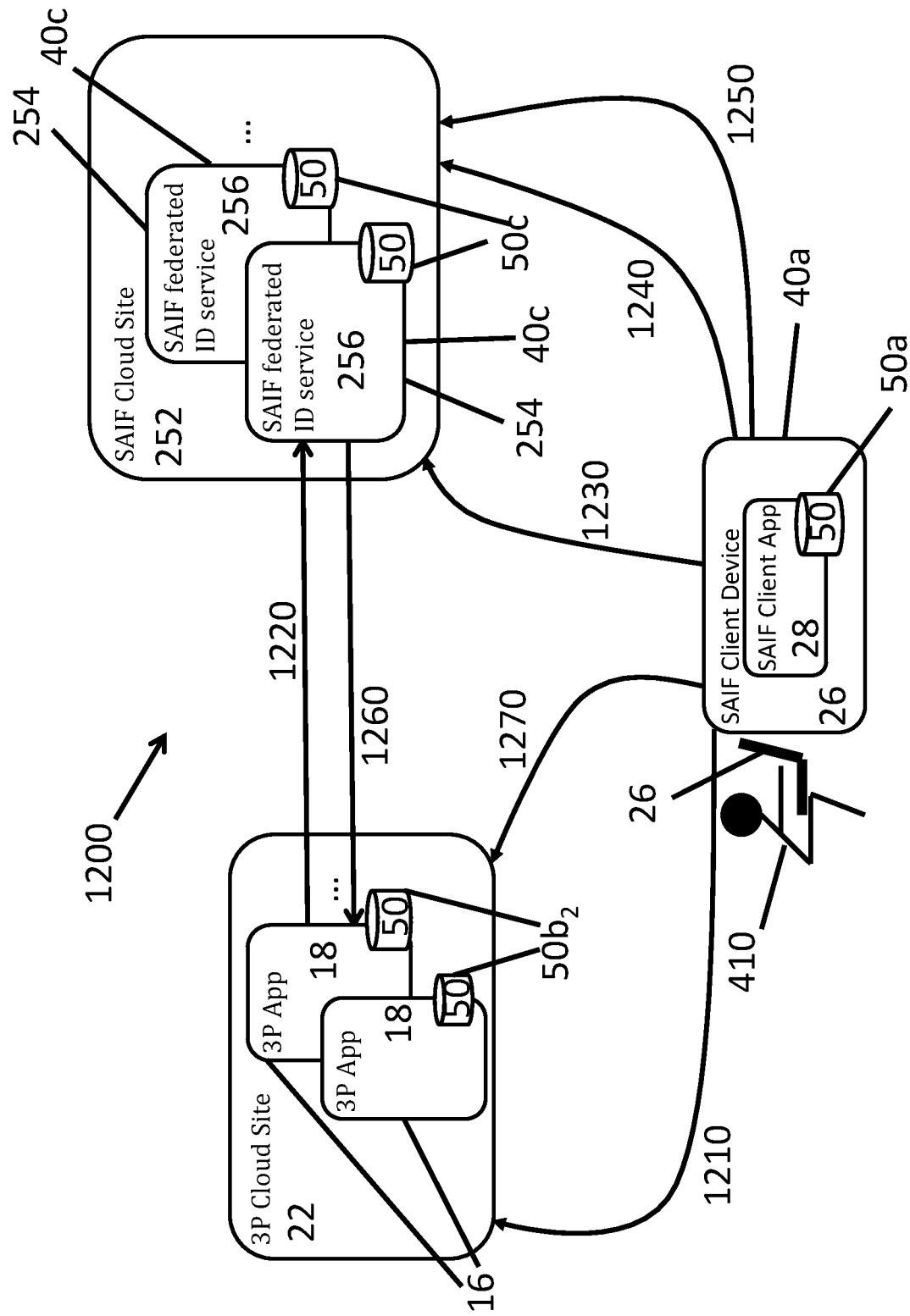
FIG. 12 is a sequence-annotated block diagram for an exemplary process for setting up a SAIF user on a third-party site, according to the second embodiment.

FIG. 12 is a sequence-annotated block diagram for a process for setting up a SAIF user on a third-party site, according to the second embodiment employing the federated model 250 (wherein the SAIF login of the SAIF Federated ID Service 256 is externally hosted by the SAIF site 252). With reference to FIG. 12, as an example of a SAIF user setup process 1200 on the 3P cloud site 22, client setup may entail seven general steps, labeled with reference numbers 1210, 1220, 1230, 1240, 1250, 1260, and 1270, such as shown in FIG. 12, according to the second embodiment.

According to a first transaction 1210, the user 410 requests creation of a third-party account on the 3P app 18 using SAIF as her federated login provider.

According to a second transaction 1220, the user 3P app 18 redirects the request to the SAIF cloud service 256 at the SAIF site 252. The 3P app 18 may recognize that the user 410 has the SAIF client app 28 on the SAIF Client Device 26. For example, the 3P app 18 presents a login screen with the option to register a new user 410 using SAIF credentials whereby the user 410 selects this option to create her account using SAIF.

According to a third transaction 1230, the user 410 logs into the SAIF federated ID service 256 on the SAIF site 252. This login step 1230 may utilize the user SAIF ID and user SAIF credentials as previously discussed. This login step 1230 may be omitted if the user 410 is already logged into the SAIF federated ID service 256. In some examples, this login step 1230 may be omitted if the user 410 is already logged into the SAIF client app 28 on the SAIF Client Device 26.

According to a fourth transaction 1240, the user 410 selects SAIF credentials for the third-party account. In some examples, the SAIF federated ID service 256 on the SAIF server 254 provides the user 410 with a list of the identity properties previously setup by them with SAIF, and the user 410 selects one or more of properties to be used as credentials to log in to the 3P app 18. The SAIF cloud service 256 may inform the user 410 if the selected credentials are weak or do not meet third-party minimum criteria for login to the third-party account. The SAIF federated ID service 256 then saves the selected credentials for use in validating the user's login at the 3P self-hosted SAIF ID service 27.

According to a fifth transaction 1250, the user 410 logs into the third-party app account on the 3P self-hosted SAIF ID service 27 through the SAIF federated ID service 256 on the SAIF site 252 by using the newly selected user credentials.

According to a sixth transaction 1260, the SAIF federated ID service 256 on the SAIF site 252 validates the modified user credentials using its stored modified credentials 500c for that user and if successful, redirects the login to the third-party account on the 3P app 18.

According to a seventh transaction 1270, the user 410 completes remaining aspects of setup of the third-party account. For example, the user 410 may be requested to provide contact and billing information and/or answer questions about preferences. In some examples, the SAIF client app 28 on the SAIF client device 26 may assist in filling in fields requesting standard information. Upon completion of the third-party account setup, the user 410 may be granted access to the resources 902 associated with the third-party account.

Figure 13:
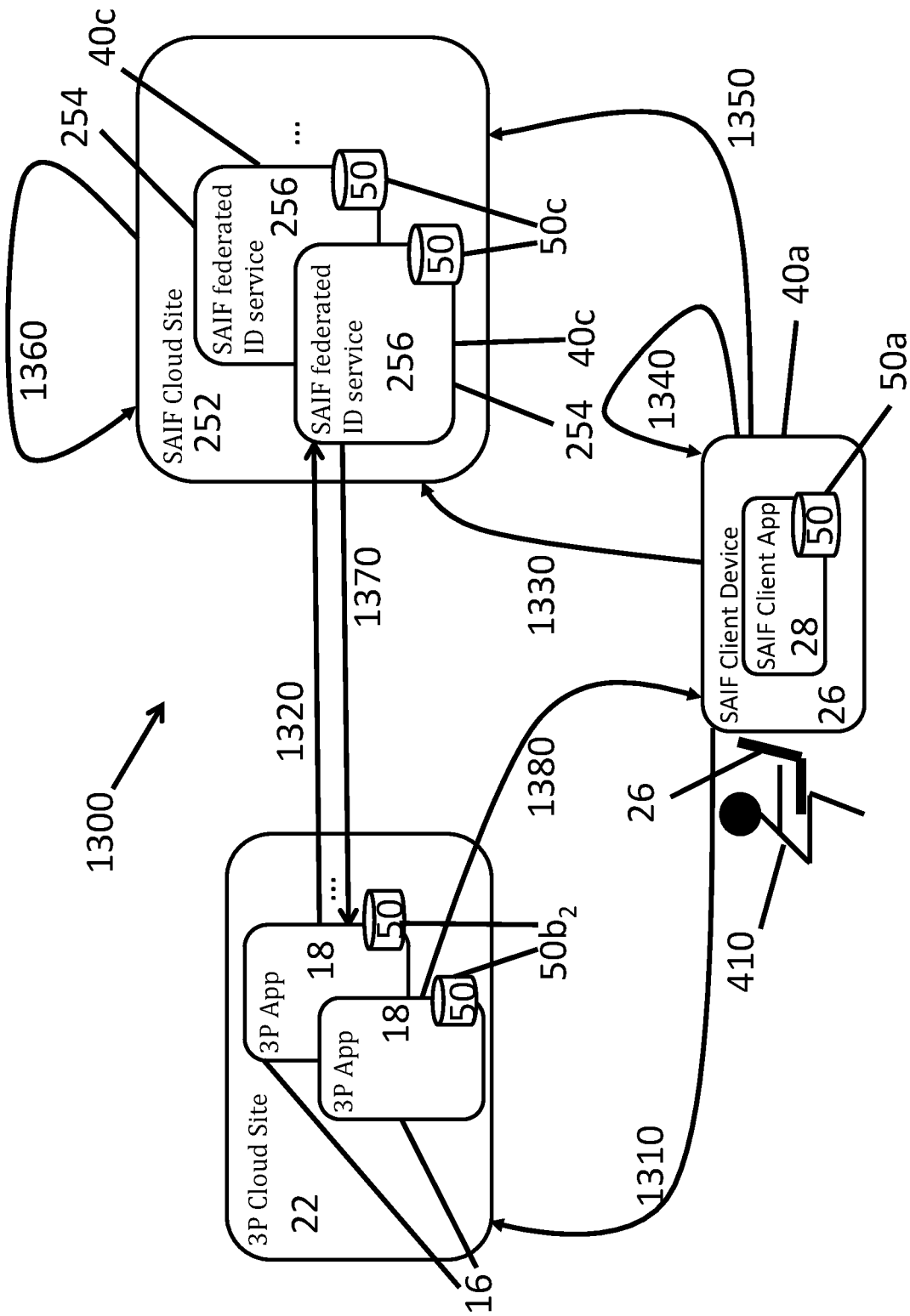
FIG. 13 is a sequence-annotated block diagram for an exemplary process for logging in a SAIF user on a third-party site, according to the second embodiment.

FIG. 13 is a sequence-annotated block diagram for a third-party login through an externally hosted SAIF process 1300 for logging in a SAIF user 410 on a third-party site through an externally hosted SAIF federated ID service 256 on the SAIF site 252, according to the second embodiment. With reference to FIG. 13, as an example of the third-party login through externally hosted SAIF process 1300 with the SAIF federated ID service 256 on the SAIF site 252, client user login may entail eight general steps, labeled with reference numbers 1310, 1320, 1330, 1340, 1350, 1360, 1370 and 1380, such as shown in FIG. 13, according to the second embodiment.

According to a first transaction 1310, the user 410 requests resource(s) 902 of, or access to, a third-party account on the third-party server 22. The user request may be initiated from the user 410 to a client browser 910 and conveyed to the 3P app 18.

According to a second transaction 1320, the 3P app 18 redirects the request to the SAIF cloud service 256 on the SAIF site 252. The 3P app 18 may recognize that the user 410 has the SAIF client app 28 on the SAIF client device 26. For example, the 3P app 18 presents a login screen with the option to register a new user using SAIF credentials whereby the user selects this option to create her account using SAIF.

According to a third transaction 1330, the user 410 logs in to the SAIF executable module (externally hosted SAIF) of the SAIF federated ID service 256 on the SAIF site 252. This SAIF login step 1330 may employ some of the same substeps described with respect to FIG. 9. In particular, the SAIF login step 1330 may prompt the user 410 to enter the user SAIF ID and the user SAIF credentials for the SAIF processing software. The SAIF client app 28 may associate the user SAIF credentials with corresponding modified user SAIF credentials or convert the user SAIF credentials to corresponding modified user SAIF credentials and then convey the modified user SAIF credentials to the SAIF federated ID service 256 on the SAIF site 252. The SAIF federated ID service 256 retrieves from its memory 50 the modified user SAIF credentials associated with the user SAIF ID, and the CPU 504 of the SAIF federated ID service 256 employs its processing software to compare the modified user SAIF credentials from the user 410 to the modified user SAIF credentials from the memory 50 to validate or invalidate the user 410 based on the results of the comparison. One will appreciate that this SAIF login step 1330 (and most of the associated substeps) may be omitted if the user 410 has already logged into the SAIF client app 28 on the SAIF client device 26 (or already logged into the SAIF federated ID service 256 on the SAIF site 252).

According to a fourth transaction 1340, the user 410 enters the SAIF credentials for the third-party account. The SAIF client app 28 coverts the third-party SAIF credentials to corresponding third-party SAIF modified credentials.

According to a fifth transaction 1350, the SAIF client app 28 sends the modified credentials (corresponding to the user-entered credentials) to the SAIF executable module on the SAIF federated ID service 256 on the SAIF site 252.

According to a sixth transaction 1360, the SAIF executable module on the SAIF federated ID service 256 on the SAIF site 252 validates the modified credentials. The SAIF cloud service 256 checks with its memory 50 to retrieve the third-party SAIF modified credentials associated with the user SAIF ID. The CPU 504, associated with the SAIF server 254, employs processing software of the SAIF cloud service 256 to compare the third-party SAIF modified credentials from the SAIF client device 26 (converted from the credentials entered by the user 410) to the third-party SAIF modified credentials from the memory 50 associated with the SAIF federated ID service 256 and validates or invalidates the user 410 based on the results of the comparison.

According to a seventh transaction 1370, the SAIF federated ID service 256 on the SAIF site 252 redirects the login to the third-party account on the 3P app 18 or simply indicates that the login is validated.

According to an eighth transaction 1380, the third-party account through the 3P app 18 grants the user 410 access to the requested resources 902 associated with the third-party account.

Figure 14:
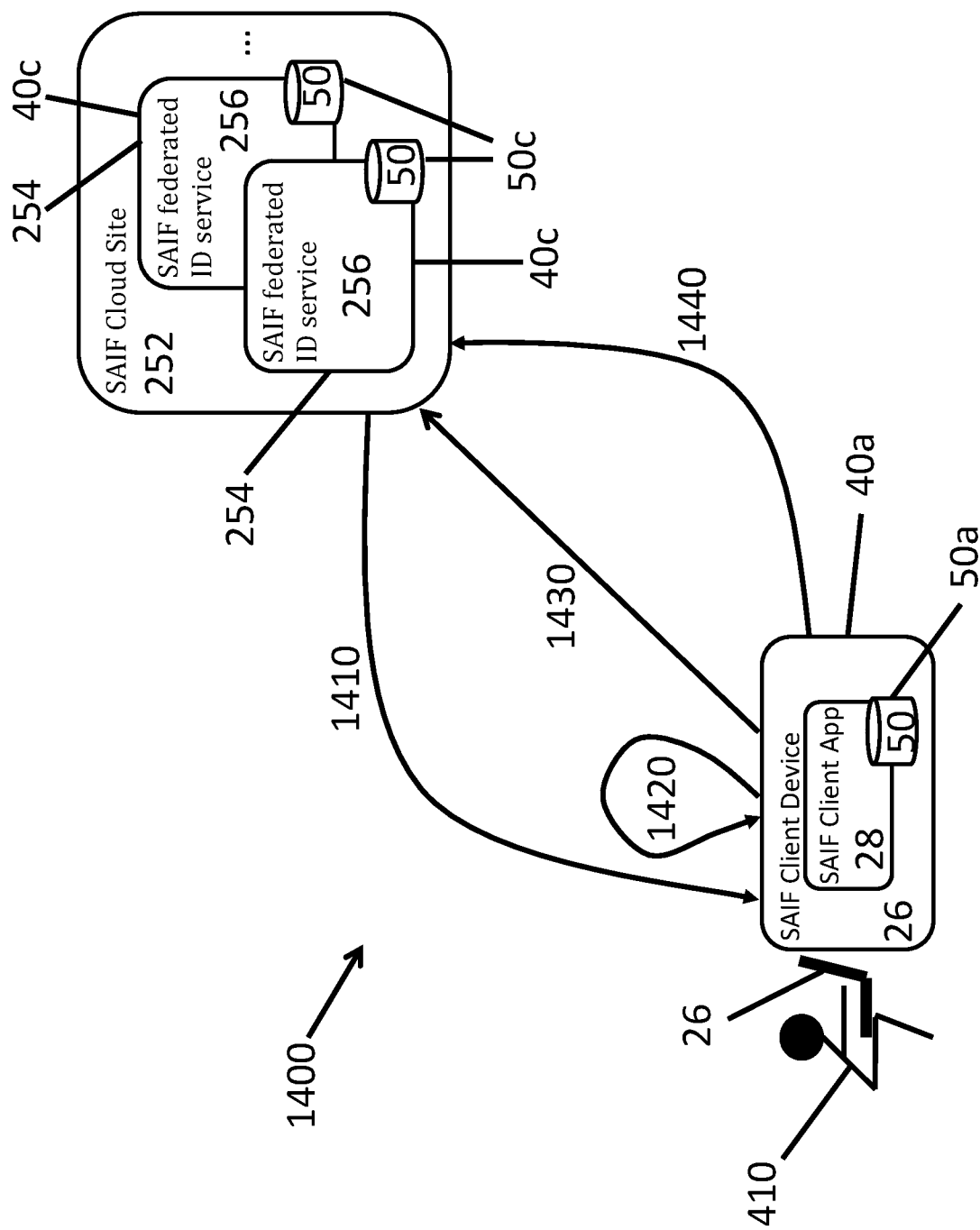
FIG. 14 is a sequence-annotated block diagram for an exemplary process for setting up a user to use SAIF, according to the third embodiment employing the hybrid model.

FIG. 14 is a sequence-annotated block diagram for an exemplary process for setting up a user 410 to use SAIF, according to the third embodiment employing the hybrid model 350. With reference to FIG. 14, as an example of a SAIF user setup (hybrid SAIF) process 1400, client setup may entail four general steps, labeled with reference numbers 1410, 1420, 1430, and 1440, such as shown in FIG. 14, according to a third embodiment.

According to a first transaction 1410, the user 410 downloads and installs the SAIF client app 28 onto her client device(s) 26.

According to a second transaction 1420, the user 410 uses the installed SAIF client app 28 on her client device 26 to set the user 410 up as a SAIF client by defining her user credential properties.

According to a third transaction 1430, the user 410 uses the installed SAIF client app 28 to set up a SAIF client account identifying and providing the properties she would like to use to authenticate herself to the SAIF client app 28 and/or the SAIF federated ID service 256.

According to a fourth transaction 1440, the installed SAIF client app 28 encrypts and saves her encrypted user data locally on her client device 26 and optionally with the SAIF federated ID service 256 (such as for the purpose of backup). (The SAIF client also creates a modified version of the SAIF credentials and sends these modified credentials and credential property metadata to the SAIF service for use in runtime validation of the SAIF credentials.) One will appreciate that, from the user's perspective, the SAIF client setup may be identical regardless of whether the client setup is used in conjunction with the third-party-app-hosted model 20 (wherein the SAIF login is internally hosted by the third-party server 22) or the federated model 250 (wherein the SAIF login is externally hosted by the SAIF site 252) or the hybrid model 350 (wherein the SAIF login is internally hosted by the third-party server 22).

Figure 15:
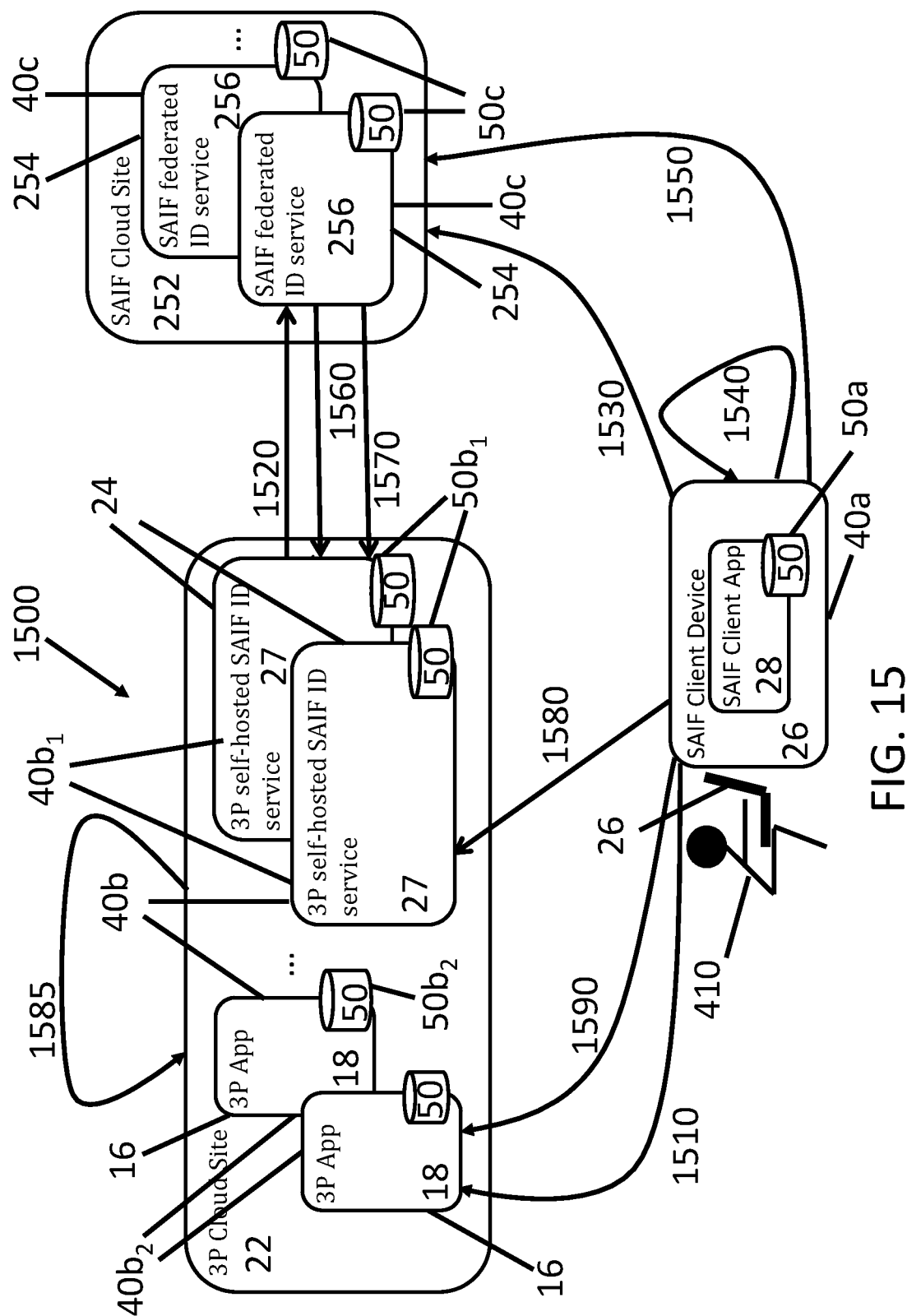
FIG. 15 is a sequence-annotated block diagram for an exemplary process for setting up a SAIF user on a third-party site, according to the third embodiment employing the hybrid model.

FIG. 15 is a sequence-annotated block diagram for a process for setting up a SAIF user on a third-party site, according to the third embodiment employing the hybrid model 350. With reference to FIG. 15, as an example of a SAIF user setup process 1500 on the 3P cloud site 22, client setup may entail ten general steps, labeled with reference numbers 1510, 1520, 1530, 1540, 1550, 1560, 1570, 1580, 1585, and 1590, such as shown in FIG. 15, according to the third embodiment.

According to a first transaction 1510, the user 410 requests creation of a third-party account on the 3P app 18 using SAIF as her federated login provider.

According to a second transaction 1520, the 3P app 18 redirects the request to the SAIF cloud service 256 at the SAIF site 252. The 3P app 18 may recognize that the user 410 has the SAIF client app 28 on the SAIF client device 26. For example, the 3P app 18 presents a login screen with the option to register a new user using SAIF credentials whereby the user selects this option to create her account using SAIF.

According to a third transaction 1530, the user 410 logs into the SAIF Federated ID Service 256 on the SAIF site 252. This login step 1530 may utilize the user SAIF ID and user SAIF credentials as previously discussed. This login step 1530 may be omitted if the user 410 is already logged into the SAIF federated ID service 256. In some examples, this login step 1530 may be omitted if the user 410 is already logged into the SAIF client app 28 on the SAIF client device 26.

According to a fourth transaction 1540, the user 410 selects SAIF credentials for the third-party account on the SAIF client app 28. In some examples, the SAIF federated ID service 256 on the SAIF server 254 provides the user 410 with a list of the identity properties previously setup by them with SAIF, and the user 410 selects one or more of properties to be used as credentials to log in to the 3P app 18.

According to a fifth transaction 1550, the SAIF client app 28 sends the selected properties to be used as credentials to log in to the 3P app 18 to the SAIF Federated ID Service 256. The SAIF federated ID service 256 may inform the user 410 if the selected credentials are weak or do not meet third-party minimum criteria for login to the third-party account. The SAIF federated ID service 256 then saves the selected credentials for use in validating the user's login at the 3P self-hosted SAIF ID service 27.

According to a sixth transaction 1560, the SAIF federated ID service 256 on the SAIF site 252 then sends a copy of the selected credential properties and associated modified credential values for user 410 to the 3P-self-hosted SAIF ID service 27 at the 3P cloud site 22. The 3P-self-hosted SAIF ID service 27 saves the modified credentials and associated properties metadata for user 410 in its memory 50b for use in the 3P login process described later.

According to a seventh transaction 1570, the SAIF federated ID service 256 on the SAIF site 252 then redirects the login to the 3P self-hosted SAIF ID service 256 on the 3P cloud site 22. The 3P self-hosted SAIF ID service 27 prompts the user 410 for login credentials.

According to an eighth transaction 1580, the user 410 logs into the third-party account on the 3P cloud site 22 through the 3P-self-hosted SAIF ID service 27 by using the newly selected user credentials.

According to a ninth transaction 1585, the 3P-self-hosted SAIF ID service 27 on the 3P cloud site 22 then validates the credentials by referring to the credentials stored in its memory 50b and transfers control to the 3P app 18.

According to a tenth transaction 1590, the user 410 completes remaining aspects of setup of the third-party account. For example, the user 410 may be requested to provide contact and billing information and/or answer questions about preferences. In some examples, the SAIF client app 28 on the SAIF client device 26 may assist in filling in fields requesting standard information. Upon completion of the third-party account setup, the user 410 may be granted access to the resources 902 associated with the third-party account.

Figure 16:
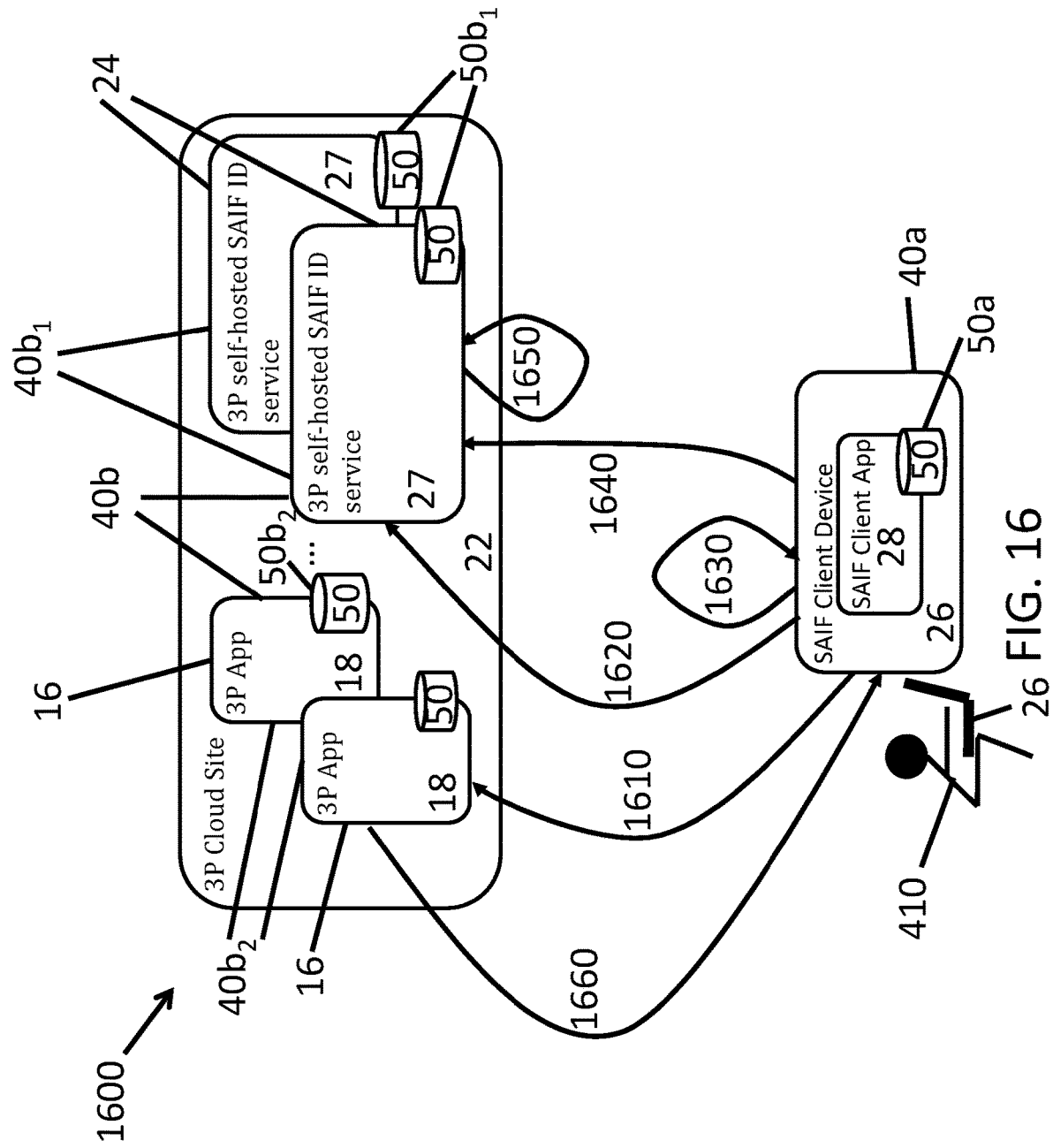
FIG. 16 is a sequence-annotated block diagram for an exemplary SAIF-user third-party login process for logging in a SAIF user on a third-party site or server, according to the third embodiment employing the hybrid model.

FIG. 16 is a sequence-annotated block diagram for a SAIF-user third-party login process 1600 for logging in a SAIF user 410 on a third-party site or server 22, according to the third embodiment employing the hybrid model 350.

One will appreciate that the SAIF cloud service 256 on the SAIF site 252 need not be involved for this example of a SAIF-user third-party login process 1600. With reference to FIG. 16, as an example of the SAIF-user third-party login process 1600 on the 3P self-hosted SAIF ID service 27 in the hybrid model, the runtime login process may entail six general steps, labeled with reference numbers 1610, 1620, 1630, 1640, 1650 and 1660, such as shown in FIG. 16, according to a third embodiment.

According to a first transaction 1610, the user 410 requests access to, a third-party account on the 3P cloud site 22. The 3P app 18 forwards the request to the 3P self-hosted SAIF ID service 27. The 3P self-hosted SAIF ID service 27 prompts the user 410 to log into SAIF.

According to a second transaction 1620, the user 410 logs in to the 3P self-hosted SAIF ID service 27 on the 3P cloud site 22 by entering their SAIF credentials for SAIF ID service 27. The SAIF ID service 27 checks with its memory 50b to retrieve the modified user SAIF credentials associated with the user SAIF ID and validates or invalidates the user 410 based on the results of the comparison. If validation is successful, the SAIF ID service 27 prompts the user 410 to provide third-party SAIF credentials for access to the third-party account. One will appreciate that this SAIF login step 820 (and most of the associated substeps) may be omitted if the user 410 has already logged into the SAIF client app 28 on the SAIF client device 26 with the help of a persistent login protocol for SAIF. Such a persistent login protocol may be implemented for example by the SAIF ID service granting the client a persistent token at its initial SAIF login, and this token may be valid for a period of time beyond which it would time out and invalidate the token. During the time that the token is valid, the client software, when needing to interact with the SAIF ID service, may present the token to the SAIF ID service, and the service, after validating the token, may honor the token and eliminate the optional SAIF user login substeps under step 820, described above.

According to a third transaction 1630, the user 410 enters the SAIF credentials for the third-party account. The client app 28, associates the third-party SAIF credentials with corresponding third-party SAIF modified credentials or converts the third-party SAIF credentials to corresponding modified third-party SAIF credentials.

According to a fourth transaction 1640, the SAIF client app 28 sends the modified credentials (corresponding to the entered credentials) to the SAIF ID service 27 on the 3P cloud site 22.

According to a fifth transaction 1650, the SAIF ID service 27 on the 3P cloud site 22 validates the modified credentials by checking with its memory 50*b* to retrieve the third-party SAIF modified credentials associated with the user SAIF ID. The memory 50*b* presents the third-party SAIF modified credentials to the CPU 504 for running the processing software of the SAIF ID service 27. The SAIF ID service 27 through use of the associated CPU 504 compares the third-party SAIF modified credentials from the user 410 to the third-party SAIF modified credentials from the memory 50*b* and validates or invalidates the user 410 based on the results of the comparison. If the credentials are valid, the SAIF ID service 27 conveys the results of the successful validation step 1650 to the 3P app 18 and redirects the transaction back to 3P app 18.

According to a sixth transaction 1660, the third-party account through the 3P app 18 of the 3P cloud site 22 displays or grants access to requested resources associated with the third-party account. One will note again that the SAIF cloud service 256 on the SAIF site 252 need not be involved for this example of a hybrid login process 1600.

In general, as previously mentioned, there are three main processes to be accomplished by the SAIF client device 26 of the computer entity 40*a*, the third-party server 22 of the computer entity 40*b*, and/or the SAIF server 254 of the computer entity 40*c*: (1) client setup, (2) third-party app/site setup, and (3) runtime login.

Process—Client Setup

Figure 17:
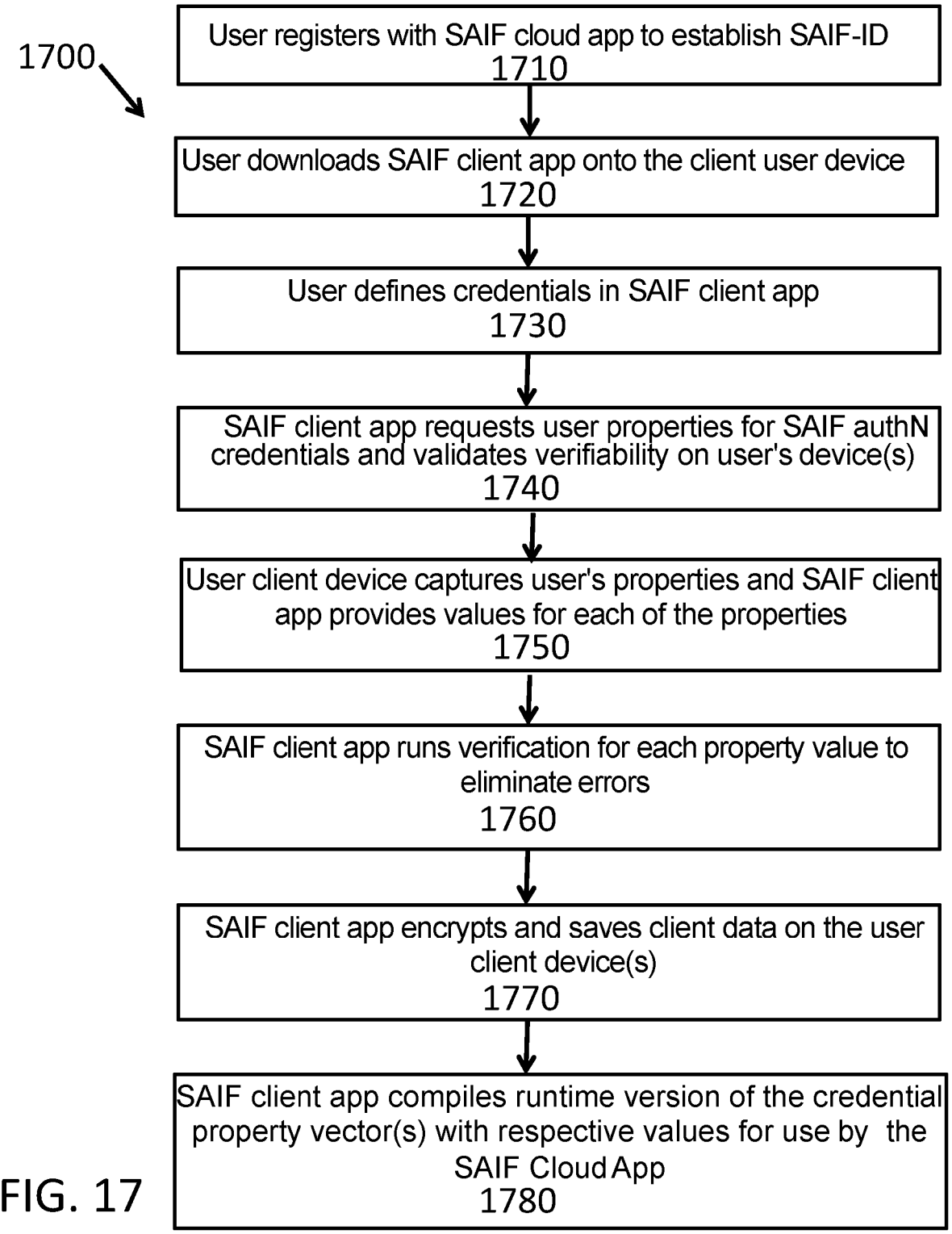
FIG. 17 is a simplified flow chart representation of an exemplary generic SAIF user setup process for setting up a user to use SAIF.

FIG. 17 is a simplified flow chart representation of an example SAIF user setup process 1700 for setting up a user 410 to use SAIF. In this example, a single SAIF user setup process 1700 process can be performed that will satisfy user setup requirements for the exemplary third-party-app-hosted model 20, the federated model 250 employing the SAIF cloud service 256, and the hybrid model 350. With reference to FIG. 17, an example of a client setup process may entail eight steps, such as labeled with reference numbers 1710, 1720, 1730, 1740, 1750, 1760, 1770 and 1780.

First, a user 410 registers with the SAIF cloud service 256 on the SAIF server 254 to establish a unique identifier, their user SAIF-ID. This registration step 1710 may entail payment arrangements made by the user 410, such as a one-time purchase or the setup of monthly payment arrangements, for example. Successful payment arrangements may cause the SAIF cloud service 256 to provide, such as by email or text message, the user SAIF-ID, which may be the same or different from a proof of purchase code employed to permit download of the SAIF software. One will appreciate that proof of purchase codes, SAIF-IDs, and/or the SAIF software itself may be available for purchase at physical stores.

Next, the user 410 then downloads the SAIF client app 28 onto their SAIF client device(s) 26. This download and install step 1720 resembles similar steps described with respect to FIGS. 6, 11, and 14. One will appreciate that if a hard copy of the SAIF processing software, such as on a disc, was purchased at a physical store, the user 410 may optionally skip the download step 1720. Even so, a software update through the SAIF cloud service 256 on the SAIF server 254 may be available.

Next, in a defining credentials step 1730, the user 410 uses the installed SAIF client app 28 on her SAIF client device 26 (laptop, mobile, etc.) to define her credential properties. The credential properties can be identification metadata which may include, for example, name, address, password, right thumbprint, facial picture, facial video, voice sample, favorite restaurant, location of secret tattoo, year of a personal event, mobile #, iris scan, last Facebook® posting, or last direction to the Alexa® digital assistant, etc., essentially anything she believes she uniquely knows (e.g., password), owns (e.g., mobile device or Facebook® posting), is (e.g., biometric data), or otherwise wishes to use for authentication.

In many embodiments, the credential properties may be a user-defined set of multiple identification properties. For example, the user 410 may select fingerprint, facial recognition, and mother's first employer to be verified to provide the authentication of the user 410. This user-defined set of identification properties allows for the possibility to have multiple passwords of different strengths and can also include dynamic passwords. This SAIF client-setup step 1730 resembles similar steps described with respect to FIGS. 6, 11, and 14.

In a property selection step 1740, the SAIF client app 28 asks the user 410 to select the properties (credentials) that she would like to use to authenticate herself to the SAIF client app 28 on the SAIF client device 26 and/or to the SAIF cloud service 256 on the SAIF site 252. These credentials can be the same for both of these SAIF entities, or in some examples the user 14 can choose to use different credentials for each of the SAIF client app 28 on the SAIF client device 26 and/or to the SAIF Federated ID Service 256 (sometimes referred to as SAIF cloud service 256) on the SAIF site 252. These credentials are the SAIF authN credentials. This SAIF account-setup step 1740 resembles similar steps described with respect to FIGS. 6, 11, and 14. The SAIF client app 28 and/or the SAIF cloud service 256 will validate that the properties are indeed verifiable on her registered user SAIF client device(s) 26 for use of the properties. For example, facial recognition would utilize the camera 516, or voice recognition would utilize the microphone 514, etc. One will appreciate that in many examples the user 410 will typically register additional SAIF client device(s) 26 individually. Once such additional SAIF client device(s) 26 are registered, various components of the software and memory 50 associated with SAIF and with the user original credentials or modified credentials may be copied onto the additional registered SAIF client device (s) 26.

In a property provision step 1750, the user 410 then uses the SAIF client app 28 to provide values for each of the properties captured by the SAIF client device 26. As previously noted, the SAIF client device 26 should be operable to capture the properties, e.g., photograph, fingerprint, DNA sample, text etc. One will appreciate that for certain properties, such as biometric data, the SAIF client app 28 may request multiple samples of the properties. For example, for facial recognition, the SAIF client app 28 may request photos from several angles and/or distances from the camera 516; for voice recognition, the SAIF client app 28 may request repetition of user-selected or predetermined words or phrases from several angles and/or distances from the microphone 514; for fingerprint recognition, the SAIF client app 28 may request repetition of finger (including thumb) touches from several angles and/or distances from a fingerprint detector or the camera 516. This property-capture and credential-modification step 1750 may provide a subpart of the SAIF account-setup steps described with respect to FIGS. 6, 11 and 14.

Also, the user 410 may provide URLs (e.g., a Facebook® or an Alexa® URL) for respective services she wishes to include in her credential property set, e.g., services or properties that exist at these URLs. Credentials to use these services' APIs may leverage SAIF. For example, Facebook® may enable their users to log in to their Facebook® account using SAIF. Moreover, inclusion of the desired URLs with the SAIF client app 28 may permit the user 410 to directly access the resources of these websites through the SAIF client app 28. This URL-inclusion step may also provide a subpart of the SAIF account-setup steps described with respect to FIGS. 6, 11, and 14. In some embodiments, constantly changing credential properties, such as the last Facebook® posting or the last direction to Alexa® digital assistant, can be employed. SAIF would be set up to have login access to these app/sites. SAIF would access these app/sites to obtain the selected information and then transform it. The user 410 would enter the appropriate contents when prompted for credentials. These contents would be transformed using the same transformation function and then compared to the transformed version of the selected information obtained by SAIF, as more generally described.

Before the SAIF client app 28 saves her credential data to the memory 50, the SAIF client app 28 may optionally utilize the CPU 504 to run a verification session, prompting her to provide each of the properties or values she originally provided, to eliminate typographical or other input capture errors. This property-verification step 1760 may provide a subpart of the SAIF account-setup steps described with respect to FIGS. 6, 11, and 14.

Next, the SAIF client app 28 encrypts and saves the user data locally on her client SAIF client device 26. Copies of the encrypted data can be replicated across her registered SAIF client devices 26 and may be updated from any of them. The user 410 also has the choice to backup the encrypted data on the SAIF cloud service 256 on the SAIF site 252, as well. The encryption key may simply be her SAIF credentials. This SAIF credentials-backup step 1770 resembles similar steps described with respect to FIGS. 6, 11, and 14.

The SAIF client app 28 also compiles a runtime version of the credential property set with its modified values (modified credentials) for use by the SAIF cloud service 256, such as employed for the federated model 250 to engage third-party servers 22. This credential runtime-compilation step 1780 protects the user's original credential data. The compilation effectively secures the user's data referenced in the cloud by the SAIF cloud 256 with federated ID service on the SAIF server 254 when used by the SAIF authN service. The compilation secures the data by, for example, a one-way transform, which may be, for example, a one-way hash function, converting static strings using one-way hashes with salting, reducing facial or fingerprint images to identity data (e.g., distance between eyes, ratio of facial dimensions, principal component analysis (PCA), fingerprint minutiae data, etc.), thereby making sure that the user's original credential data is not maintained by the SAIF cloud service 256 on the SAIF server 254. Please note that the SAIF cloud service 256 on the SAIF server 254 may offer a cloud backup for the storage of the user's encrypted credential data, but the keys for the decryption are preferably only with the user 410 on the SAIF client device 26 and not stored in the cloud.

Process—Setup of Third-Party App/Site

Figure 18:
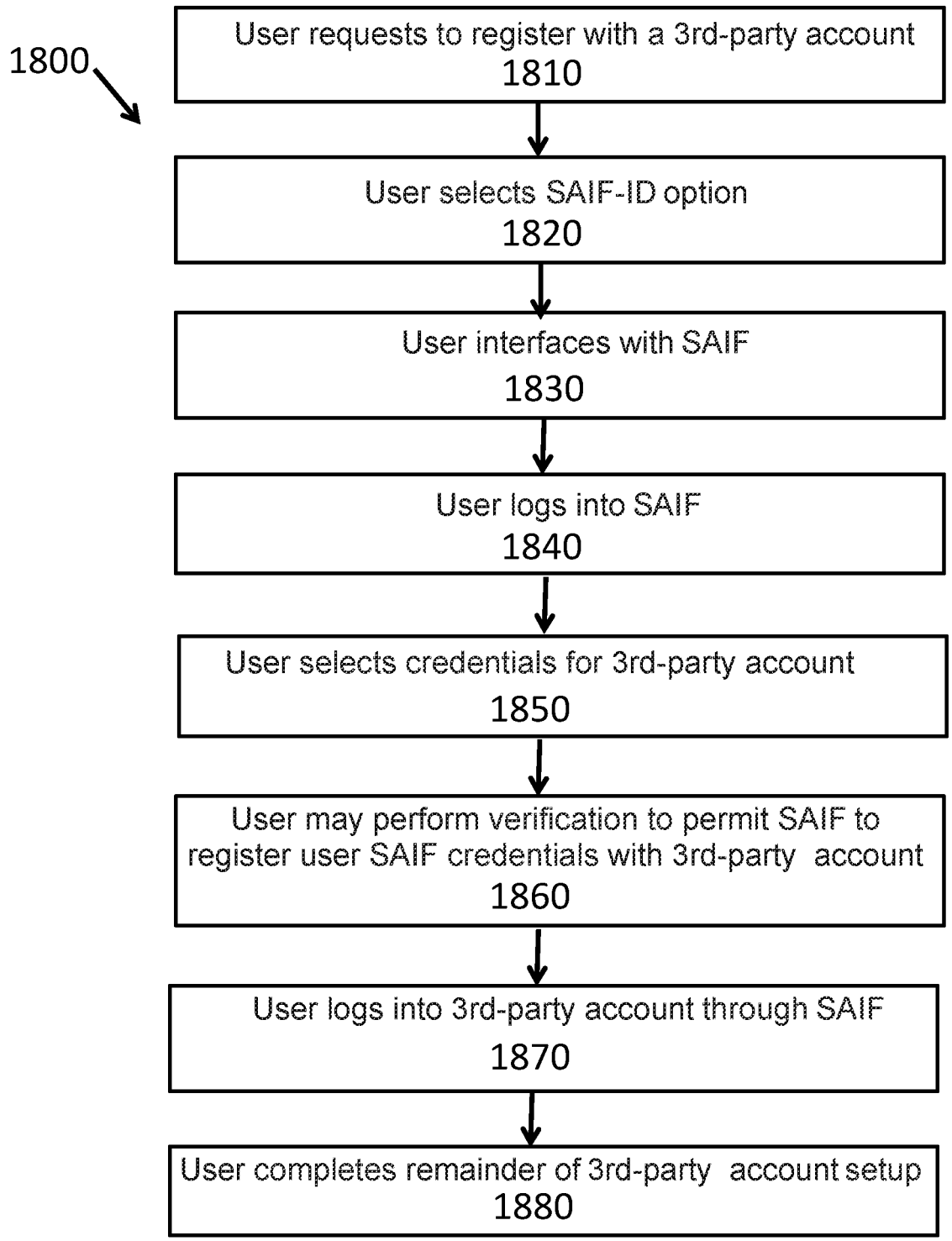
FIG. 18 is a simplified flow chart representation of an exemplary generic third-party SAIF setup process for setting up user on a third-party account through SAIF.

FIG. 18 is a simplified flow chart representation of an example third-party SAIF setup process 1800 for setting up user 410 on a third-party account through SAIF. A third-party app/site setup process 1800, suitable for use with the exemplary third-party-app-hosted model 20, the federated model 250 employing the SAIF cloud service 256, and the hybrid model 350, may entail the following steps, as one example of the third-party app/site setup process 1800.

In an account-request step 1810, a user 410 requests to register with an app/site on a third-party server 22 for the first time, and the third-party server 254 offers the user 410 the option to use their SAIF-ID. This account-request step 1810 resembles similar steps described with respect to FIGS. 7 and 12.

Next, in a SAIF selection step 1820, the user 410 selects the SAIF-ID Option.

In a SAIF-interface step 1830, the third-party app/site on the 3P cloud site 22 redirects to the SAIF setup for this third-party app/site using, for example, a pop-up overlay or a transfer to the SAIF cloud service 256 on the SAIF site 252. This SAIF-interface step 1830 resembles similar steps described with respect to FIGS. 7, 12, and 15.

In a SAIF-login step 1840, SAIF requests the user's SAIF credentials and after validating these, presents a list of properties the user 410 could choose from to authenticate at the third-party site. One will appreciate that an app/site may require a minimum authN property-set, e.g., password, but the user 410 may strengthen the set beyond this minimum. In this example, the password will have been preselected as an authN property and the user may add other credentials to be used for authorization. This SAIF-login step 1840 resembles similar steps described with respect to FIGS. 7, 12, and 15. This SAIF-login step 1840 can be omitted if the user 410 is already logged into SAIF.

In a third-party credential-selection step 1850, the user 410 selects property credentials from the list of credentials provided by the user's SAIF, in addition to the mandatory ones for the third-party. SAIF may recommend certain properties or have certain defaults in addition to the third-party app's mandatory requirements. This third-party credential-selection step 1850 resembles similar steps described with respect to FIGS. 7, 12, and 15.

In an optional verification step 1860, SAIF may send an email notification (or text message or other communication) including a verification code to one or more of the user's registered SAIF client devices 26, requesting that the user 410 enter the verification code before SAIF confirms that the user's credentials for the third-party app/site are registered.

In a SAIF-enabled third-party login step 1870, after the user's credential property-set for the third-party app/site are registered with SAIF, SAIF returns control to the third-party app/site which requests a SAIF login (see description of runtime login process below) using the new third-party SAIF credentials. The user 410 logs in through SAIF and the user's SAIF registration for the third-party app/site is completed. In some embodiments, the third-party app/site specifically requests a SAIF-federated login (see runtime, below), and the user 410 logs-in using the SAIF federated identity service to complete registration. This SAIF-enabled third-party login step 1870 resembles similar steps described with respect to FIGS. 7, 12, and 15.

In a third-party account-completion step 1880, a 3P app 18 may also request additional standard account identity properties (e.g., name, address, payment method, etc.) from the list of identity properties that the user 410 maintains in SAIF. (In some examples, SAIF may store these properties only on the SAIF client device 26 and not with the SAIF cloud service 256.) For such occasions, the SAIF property registration dialog for the third-party app may be modified to include delegating authority to SAIF to provide these data to the third-party app. The user 410 on SAIF may revoke any such delegation at any time. In practice, it may not be a good idea to allow a user's identity properties to be proliferated, such as by providing unmodified personal information to a 3P cloud site 22 or permitting such site to manage such unmodified personal information. Instead, whenever possible, it is preferable to expand SAIF services APIs to support the app's use cases in real time when requiring these data, e.g., as a payment app. For example, 3P cloud sites 22 often ask for credit card information, which may be maintained on the 3P cloud sites 22 for future transactions. If SAIF instead held the credit card information and participated directly in the payment transaction (acting as the "PayPal" for example), then a user 410 would not need to provide the credit card information to the 3P cloud sites 22 that accept SAIF. The third-party account-completion step 1880 resembles similar steps described with respect to FIGS. 7, 12, and 15.

Process—Runtime Login

Figure 19:
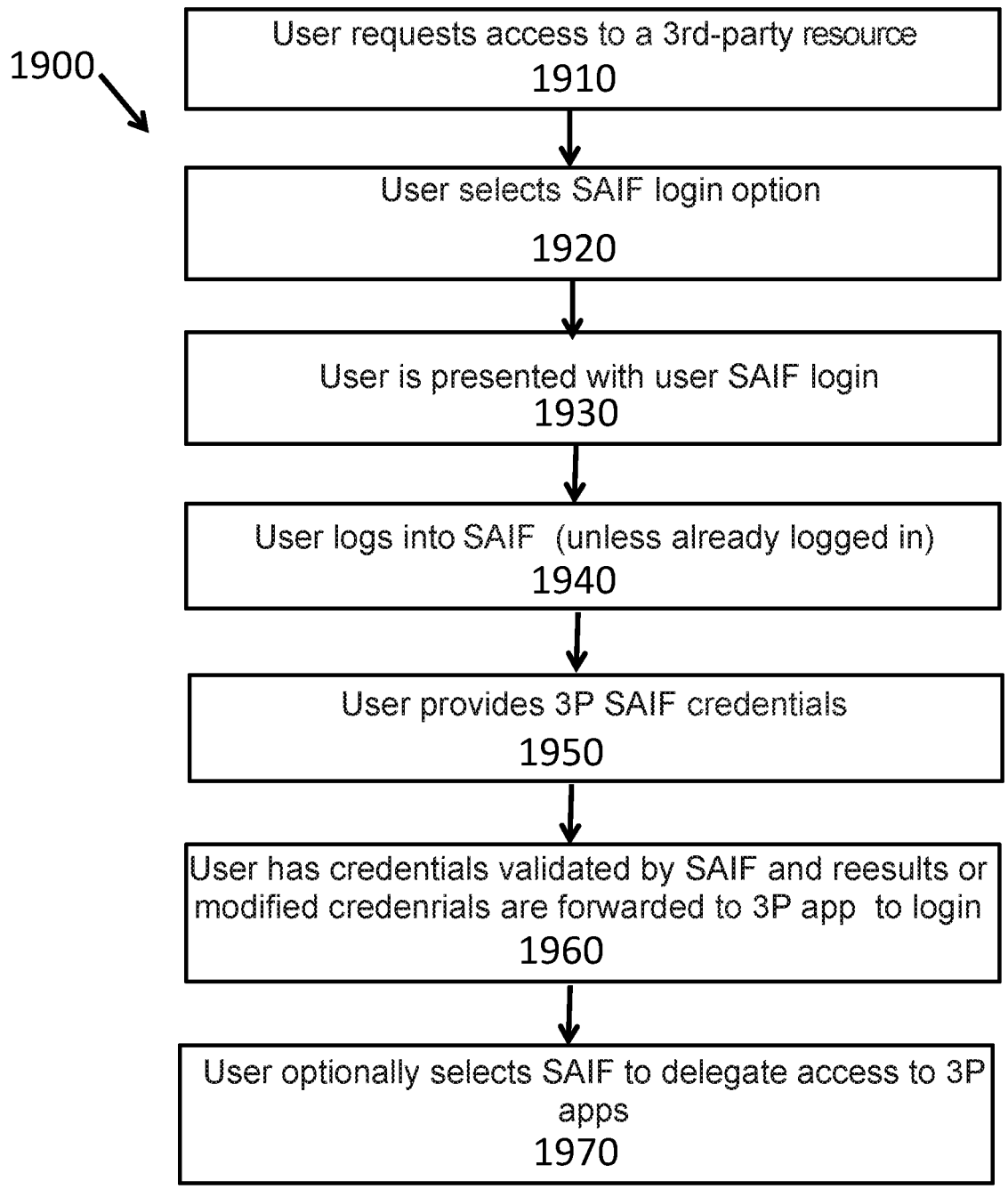
FIG. 19 is a simplified flow chart representation of an exemplary generic user login process from the perspective of a user.

FIG. 19 is a simplified flow chart representation of an example user login process 1900 from the perspective of a user 410. Runtime login using SAIF, at least in the case of a federated model 250 (e.g., the second embodiments described above), may entail the following steps, as one example of the runtime login process 1900.

In a user access-request step 1910, the user 410 navigates to or opens the 3P app 18 of the 3P cloud site 22.

In a user SAIF-selection step 1920, the 3P app 18 of the 3P cloud site 22 presents the user 410 with a login page, which also includes the option to use SAIF as a federated identity provider. The user 410 selects this option.

In a user invitation-to-SAIF login step 1930, the 3P app 18 of the 3P cloud site 22 redirects to the SAIF cloud service 256 (or the SAIF client app 28 under the 3P-app-hosted model 20) and SAIF presents its login popup overlaying the 3P app 18 of the 3P cloud site 22.

In a user SAIF-login step 1940, the login popup includes the user-specified properties (credentials) to be used for this user 410 when authenticating with this 3P app 18 of the 3P cloud site 22. Before this, the same or a separate login popup may prompt the user 410 to login to the SAIF cloud service 256 (or the SAIF client app 28 under the 3P-app-hosted model 20). For example, this may be by prompting the user 410 to enter his/her SAIF ID and password or other credential values that the user 410 may have self-defined for SAIF just as he/she can self-define for any participating 3P app 18 of a 3P cloud site 22. Alternatively, authentication to SAIF itself may be persistent for the user 410, such as, for example, by means of a persistent cookie stored on the user's SAIF client device 26. In that case, the user 410 need not enter credentials to authenticate herself/himself to SAIF every time, such as not after successfully logging in once to acquire persistence.

In a user third-party SAIF-login step 1950, the user 410 provides the input values for these credentials. Preferably, the SAIF client app 28 transforms the user's set of credential values before transmitting them to the SAIF cloud service 256, such that neither the 3P app 18 nor the SAIF cloud service 256 knows the un-modified (i.e., before transformation) credential values. This feature helps the user 410 maintain exclusive knowledge of and control over his/her credentials and therefore enhances security in the event that the transmission is intercepted or the 3P app 18 of the 3P cloud site 22 is hacked such that its user data exposed. The most that could be exposed by hacking into the 3P app 18 of the 3P cloud site 22 is a modified version of the user's credentials. A hacker would additionally need to know (a) what credentials those values correspond to, and (b) a suitable reverse transformation to reveal the unmodified credential values which is practically impossible in the case of one-way hashes or similar one-way transform functions. The likelihood of (a) and (b) is extremely low, if not practically impossible. Alternatively, the user 410 may have defined his/her credentials for the 3P app 18 of the 3P cloud site 22 to be automatic based on having successfully logged into the SAIF cloud service 256 or the SAIF client app 28.

In a user third-party SAIF-login step 1960, the SAIF cloud service 256 or the SAIF client app 28 validates the modified versions of the user-entered values. Preferably, the SAIF cloud service 256 knows the transformation algorithm and provides that algorithm to the SAIF client app 28 to use at runtime, so that only transformed credential values are transmitted. Again, as noted above, this enhances security for the user 410 by keeping the user 410 (and/or the SAIF client device 26) as the one with exclusive knowledge of his/her credentials. Alternatively, un-modified values can be encrypted and transmitted to the SAIF cloud service 256, in which case the SAIF cloud service 256 can decrypt and apply the transformations (e.g., by applying the one-way transform, for example, hashing and salting for strings, image specific identity parameters, etc.) to the user-entered values at the SAIF cloud service 256, instead of at the SAIF client device 26, before comparing them with the modified values. In that case, however, the login service would preferably not store the user-entered values. The SAIF cloud service 256 communicates success (or failure) to the 3P app 18 of the 3P cloud site 22 and returns control to the 3P app 18 of the 3P cloud site 22 with an authorization token and/or other information (depending on the protocol used).

In an optional user delegation step 1970, the SAIF cloud service 256 and/or the SAIF client app 28 may also be able to provide AuthZ information (provided by the user 410) when used to delegate access to other apps, or certain identity-related information desired by a 3P app 18 and permitted by the user (e.g., name, age, address, etc.) for convenience. In particular, because all types of identity properties can be stored by the user 410 in SAIF, SAIF can provide this information on behalf of the user 410 to the 3P cloud sites 22 that require the information, if the user 410 has delegated such authority to SAIF to provide the information. SAIF would have APIs for 3P apps 18 to request such information, and the user 410 will have granted the permission authorizing the specific 3P apps 18 to have such information.

Figure 20:
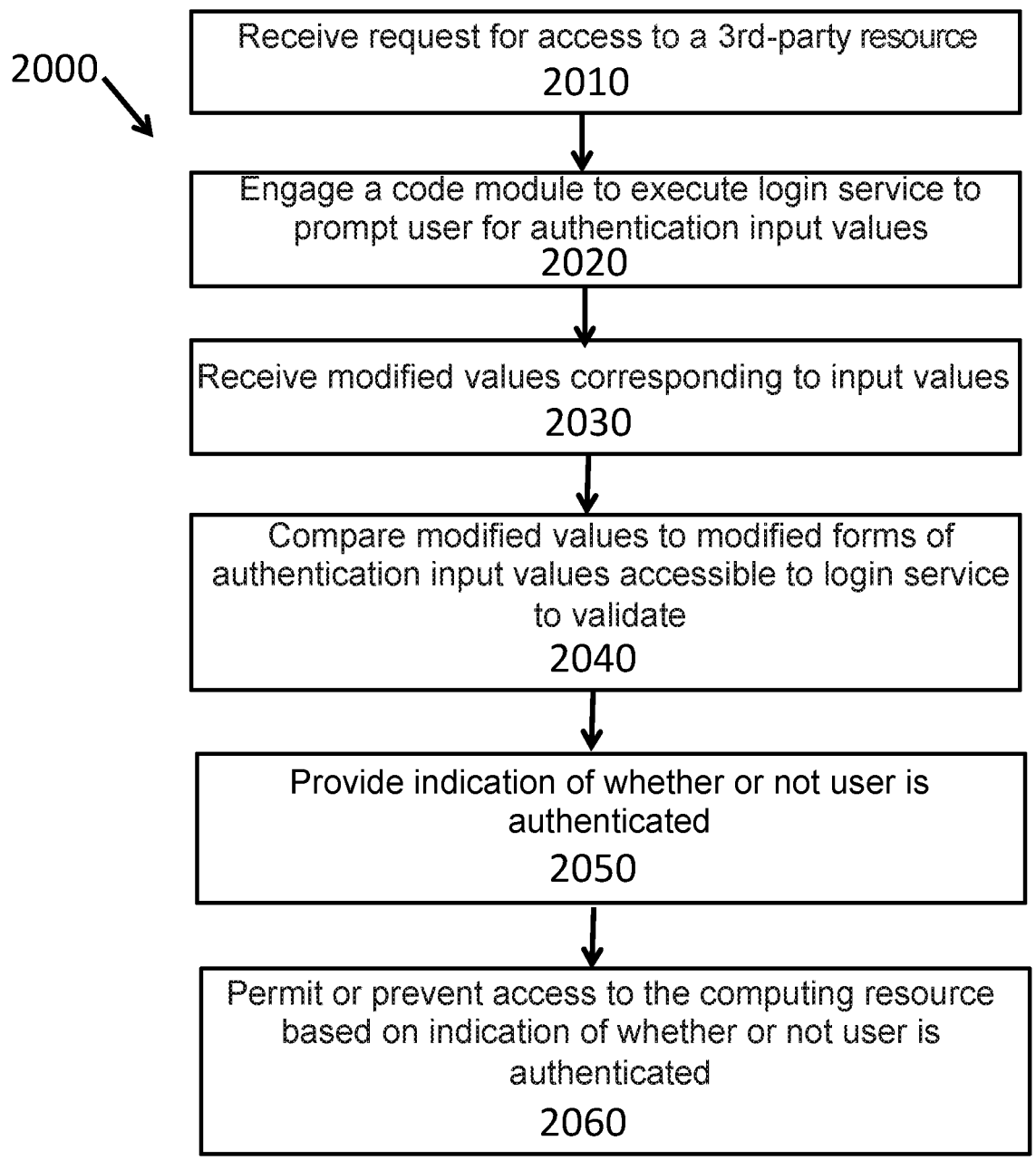
FIG. 20 is a simplified flow chart representation of an exemplary generic user login process from the perspective of the SAIF system.

Runtime login at 3P app 18 from the perspective of a SAIF system employing one or both of the SAIF client app 28 and the SAIF cloud service 256 in a runtime login process 2000 is shown in FIG. 20. In particular, a method for authenticating a user 410, using the user computing device 26 connected to a computer network 30, to access a computing resource 902 managed by a system (such as the third-party server 22) on the computer network 30, comprises at least the following steps performed by the system:

In a receive access-request step 2010, in response to a request from the user computing device 26 to access the computing resource 902, the system calls a runtime executable code module 24 to execute a login service, for which the user 410 has previously established an identity and defined a set of user-defined credentials to use to authenticate the user 410 to the system, wherein the login service:

In a login engagement step 2020, the login service transmits information to the user computing device 26 to cause the user computing device 26 to present a user interface to prompt the user 410 to input a value for each of the set of user-defined credentials that the user 410 has previously defined for authentication by the system, thereby forming a set of input values.

In a receive modified-values step 2030, the login service receives from the user computing device 26 a set of modified values, wherein each of the modified values is generated from and represents a corresponding one of the input values.

In a modified-value comparison step 2040, the login service validates the set of modified values by comparing them with corresponding modified forms of user-defined credential values stored in a memory 50 accessible to the login service.

In a provide authentication-result step 2050, the login service, based on results of the modified-value comparison step 2040, provides an indication to the system that the user 410 has either been authenticated or not been authenticated.

In a permit or prevent access step 2060, the system, in response to an indication from the login service that the user 410 has been authenticated, permits the user 410 to access the computing resource 902 as an authenticated user, or in response to an indication from the login service that the user 410 has not been authenticated, denies the user 410 access to the computing resource 902 as an unauthenticated user.

Figure 21:
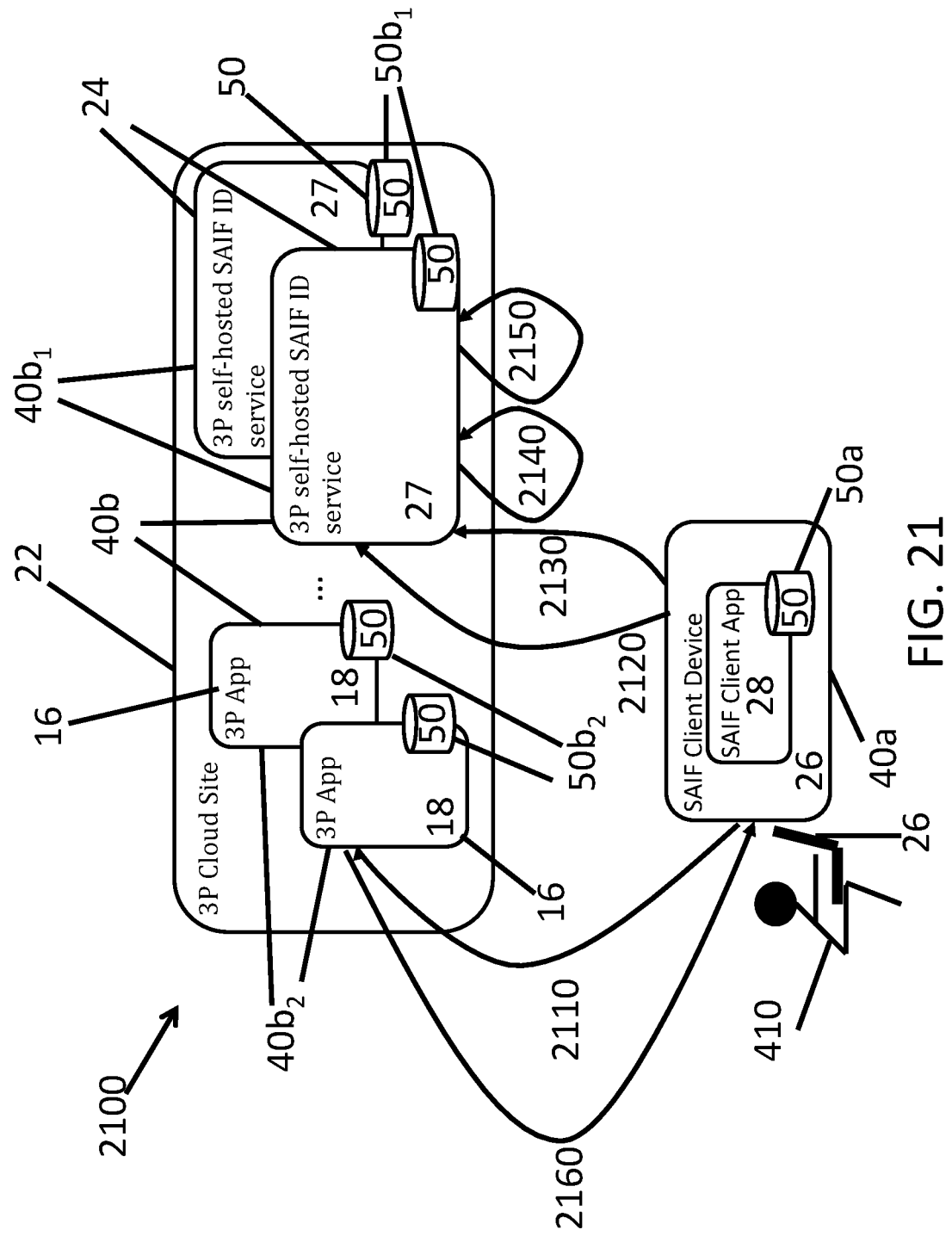
FIG. 21 is a sequence-annotated block diagram for an alternative exemplary process for logging in a SAIF user on a third-party site, according to the first embodiment.

FIG. 21 is a sequence-annotated block diagram for an alternative exemplary process 2100 for logging in a SAIF user on the 3P self-hosted SAIF ID service 27 on a third-party site, according to the first embodiment. With reference to FIG. 21, the runtime SAIF-user third-party login process 2100 may entail six general steps, labeled with reference numbers 2110, 2120, 2130, 2140, 2150, and 2160, such as shown in FIG. 21, according to a first embodiment. These steps are similar to the respective steps 810, 820, 840, 830, 850, and 860 as shown in connection with FIG. 8. However, the sequence of the steps 2130 and 2140 are reversed with respect to the sequence of the steps 830 and 840, and the step 2140 occurs at the 3P self-hosted SAIF ID service 27 on a third-party site instead of at the client device. In other words, in the step 2130 the unmodified credentials are sent (over an encrypted HTTPS session) to the SAIF service, and in the step 2140 they are transformed into their modified values before being compared and validated in the step 2150 with the saved, modified credentials. One will appreciate that similar modifications could apply to transferring unmodified credentials for the cases of adding a SAIF login to a 3P system with respect to the setup process 700 shown in FIG. 7.

Figure 22:
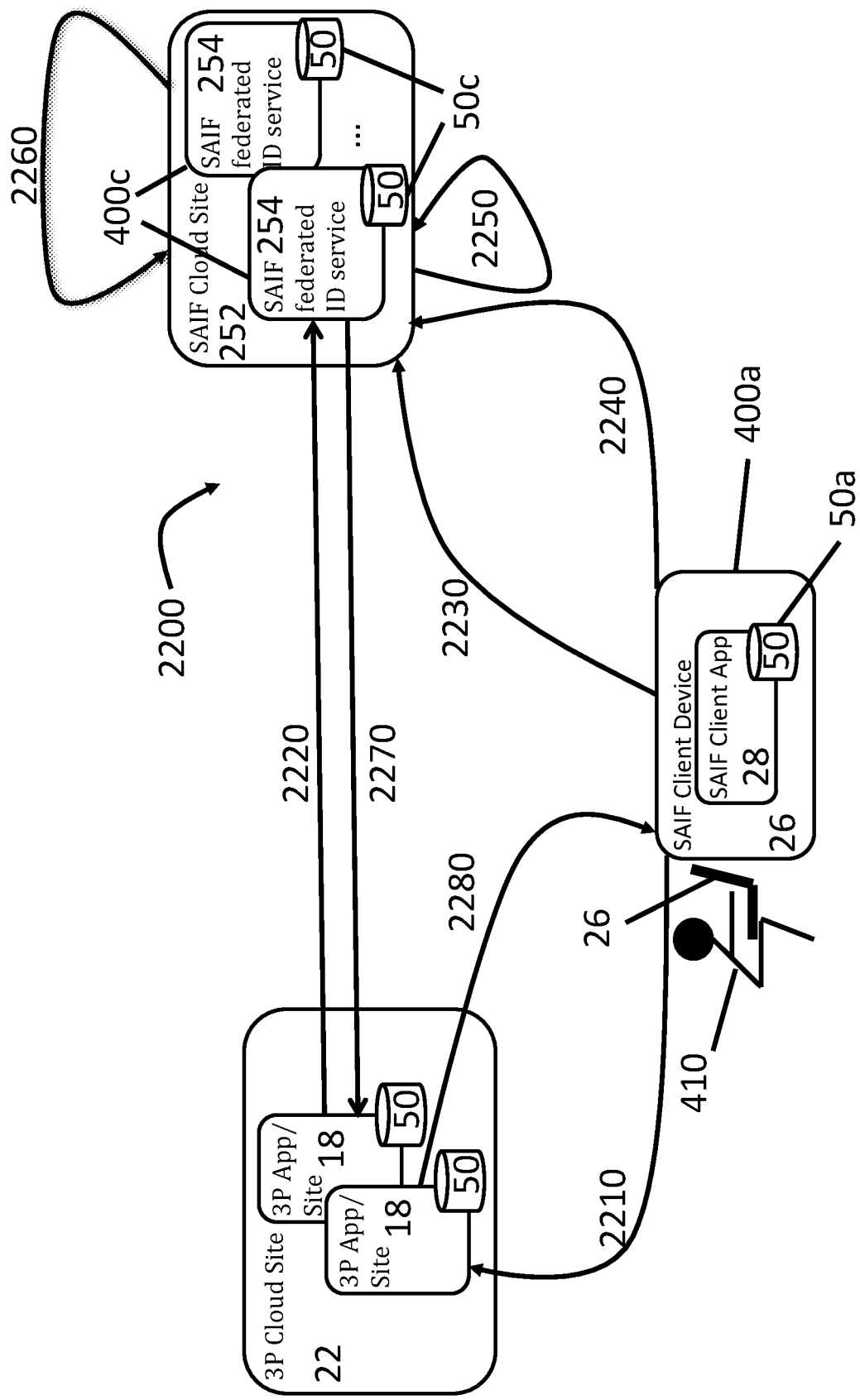
FIG. 22 is a sequence-annotated block diagram for an alternative exemplary process for logging in a SAIF user on a third-party site, according to the second embodiment.

FIG. 22 is a sequence-annotated block diagram for an alternative exemplary third-party login through externally hosted SAIF process 2200 for logging in a SAIF user with the SAIF federated ID service 256 on the SAIF site 252, according to the second embodiment. With reference to FIG. 22, client user login may entail eight general steps, labeled with reference numbers 2210, 2220, 2230, 2240, 2250, 2260, 2270 and 2280, such as shown in FIG. 22, according to the second embodiment. These steps are similar to the respective steps 1310, 1320, 1330, 1350, 1340, 1360, 1370 and 1380 as shown in connection with FIG. 13. However, the sequence of the steps 2240 and 2250 are reversed with respect to the sequence of the steps 1340 and 1350, and the step 2250 occurs at the 3P self-hosted SAIF ID service 27 on a third-party site instead of at the client device. In other words, in the step 2240 the unmodified credentials are sent (over an encrypted HTTPS session) to the SAIF service, and in the step 2250 they are transformed into their modified values before being compared and validated in the step 2260 with the saved, modified credentials. One will appreciate that similar modifications could apply to transferring unmodified credentials for the cases of adding a SAIF login to a 3P system with respect to the setup process 1200 shown in FIG. 12.

Figure 23:
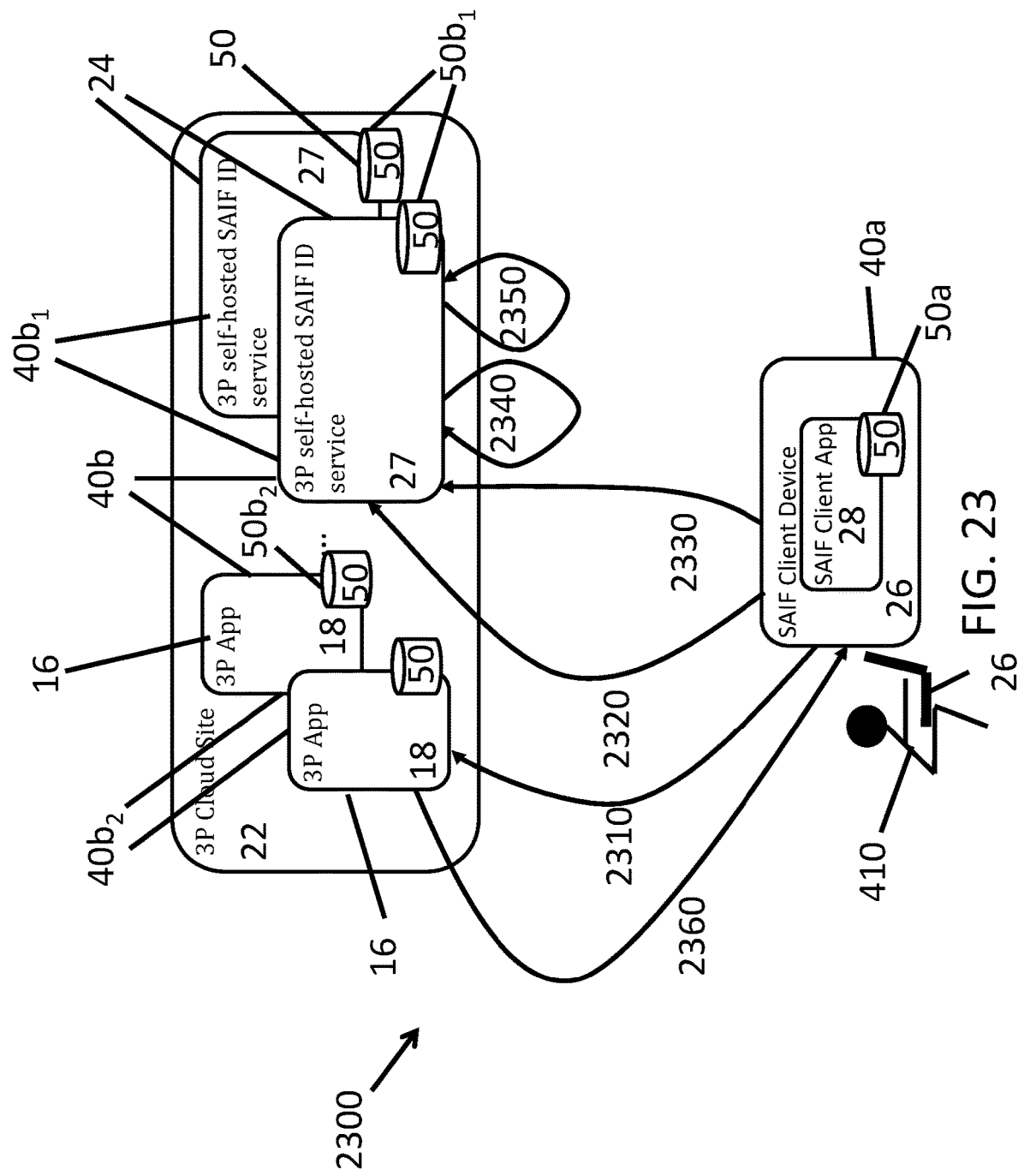
FIG. 23 is a sequence-annotated block diagram for an alternative exemplary process for logging in a SAIF user on a third-party site or server, according to the third embodiment employing the hybrid model.

FIG. 23 is a sequence-annotated block diagram for an alternative exemplary SAIF-user third-party login process 2300 for logging in a SAIF user on the 3P self-hosted SAIF ID service 27 on a third-party site or server in the hybrid model, according to the third embodiment employing the hybrid model. With reference to FIG. 23, the SAIF-user third-party login process 2300 may entail six general steps, labeled with reference numbers 2310, 2320, 2330, 2340, 2350 and 2360, such as shown in FIG. 23, according to a third embodiment. These steps are similar to the respective steps 1610, 1620, 1640, 1630, 1650 and 1660 as shown in connection with FIG. 13. However, the sequence of the steps 2330 and 2340 are reversed with respect to the sequence of the steps 1330 and 1340, and the step 2340 occurs at the 3P self-hosted SAIF ID service 27 on a third-party site instead of at the client device. In other words, in the step 2230 the unmodified credentials are sent (over an encrypted HTTPS session) to the SAIF service, and in the step 2340 they are transformed into their modified values before being compared and validated in the step 2350 with the saved, modified credentials. One will appreciate that similar modifications could apply to transferring unmodified credentials for the cases of adding a SAIF login to a 3P system with respect to the setup process 1500 shown in FIG. 15.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. In particular, the order of steps, functions, or operations may be performed in an order different from what has been described herein, or simultaneously. The terms "first," "second," etc. do not necessarily imply a sequence; nor does the order of reference numbers used in the drawings necessarily imply an order or sequence. Moreover, skilled persons will appreciate that the subject matter of any sentence or paragraph can be combined with the subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A method for authenticating a user, using a user computing device connected to a computer network, to access a computing resource managed by a system on the computer network, the method comprising at least the following steps performed by a server independent of the system but in communication with the system:

receiving a request from the system to authenticate the user to access the computing resource;

transmitting information to the user computing device to cause the user computing device to present a user interface to prompt the user to input a value for each of a set of user-defined credentials, thereby forming a set of input values;

receiving from the user computing device a set of modified values, wherein each of the modified values is generated from and represents a corresponding one of the input values;

validating the set of modified values by comparing them with corresponding modified forms of user-defined credential values stored in a memory at and accessible to the server; and based on validating the set of modified values, providing an indication to the system that the user has either been authenticated or not been authenticated to access the computing resource;

wherein the user has previously defined the type of each of the set of user-defined credentials without being restricted to credential types predefined by the system and wherein the user has previously established the value for each of the set of user-defined credentials.

2. The method of claim 1, further comprising:

in response to receiving a request from the system to authenticate the user to access the computing resource and before transmitting information to the user computing device to cause the user computing device to present the user interface, authenticating the user to the server.

3. The method of claim 2, wherein authenticating the user to the server comprises:

transmitting information to the user computing device to cause the user computing device to present a user interface to prompt the user to input a value for each of one or more credentials for the server, thereby forming a set of server-login input values; and determining whether the set of server-login input values authenticate the user to the server.

4. The method of claim 3, wherein the one or more credentials for the server consist of a login ID and a password, the set of server-login input values consists of a login value and a password value entered by the user, and wherein said determining whether the set of server-login input values authenticate the user to the server comprises checking whether login value and a password value entered by the user match values stored by the server.

5. The method of claim 3, wherein the one or more credentials for the server comprise a set of user-defined credentials, the set of server-login input values comprise modified server-login values corresponding to each of the user-defined credentials, said determining whether the set of server-login input values authenticate the user to the server comprises comparing the modified server-login values with corresponding modified forms of user-defined credential values stored in a memory at and accessible to the system, and wherein said determining whether the set of server-login input values authenticate the user to the server is based on said comparing.

6. The method of claim 1, wherein the set of user-defined credentials comprises one or more credentials of the following types: a login, a password, an answer to a security question, a biometric, and data transmitted to the user by an independent channel.

7. The method of claim 1, wherein a modified value and its corresponding input value are related by a one-way transform function.

8. The method of claim 1, wherein the set of user-defined credentials is not known to the system.

9. The method of claim 1, wherein the set of input values is not known to the system and not known to the server.

10. The method of claim 1, wherein the relationship between a modified value and its corresponding input value is not known to the system.

11. The method of claim 1, wherein the server is a federated server.

12. The method of claim 1, wherein the previously established credential values are stored in unmodified form only at the user computing device, and wherein the modified values have been previously provided to the server to facilitate authentication of the user by the server.

13. The method of claim 1, wherein said receiving a request from the system to authenticate the user to access the computing resource comprises receiving the request at the server directly from the system without passing through the client computing device as an intermediary.

14. The method of claim 1, wherein each user-defined credential type is specified by metadata created at the user computing device, and wherein the metadata has been previously sent from the user computer device to the server.

15. A server for authenticating a user, using a user computing device connected to a computer network, to access a computing resource managed by a system on the computer network, the server being independent of the system but in communication with the system, the server comprising:

a memory in which are stored modified forms of each of a set of user-defined credential values for a corresponding set of user-defined credential types that the user has previously defined and for which the user has previously selected values for the server to authenticate the user to the system;

a set of one or more communication ports by which the server can communicate with the system and with the user computing device;

a processor in or associated with the system and configured to access the memory and to perform the following in response to a request from the system to authenticate the user to access the computing resource:

transmit information to the user computing device to cause the user computing device to present a user interface to prompt the user to input a value for each of the set of user-defined credentials, thereby forming a set of input values;

receive from the user computing device a set of modified values, wherein each of the modified values is generated from and represents a corresponding one of the input values;

validate the set of modified values by comparing them with corresponding modified forms of user-defined credential values stored in the memory; and based on validating the set of modified values, provide an indication to the system that the user has either been authenticated or not been authenticated to access the computing resource;

wherein the user has previously defined the type of each of the set of user-defined credentials without being restricted to credential types predefined by the system and wherein the user has previously established the value for each of the set of user-defined credentials.

16. The server of claim 15, wherein the processor is further configured to authenticate the user to the server in response to receiving a request from the system to authenticate the user to access the computing resource and before transmitting information to the user computing device to cause the user computing device to present the user interface.

17. The server of claim 16, wherein the processor is further configured to authenticate the user to the server by:
   transmitting information to the user computing device to cause the user computing device to present a user interface to prompt the user to input a value for each of one or more credentials for the server, thereby forming a set of server-login input values; and
   determining whether the set of server-login input values authenticate the user to the server.

18. The server of claim 17, wherein the one or more credentials for the server consist of a login and a password, the set of server-login input values consists of a login value and a password value entered by the user, and wherein said determining whether the set of server-login input values authenticate the user to the server comprises checking whether login value and a password value entered by the user match values stored by the system.

19. The server of claim 17, wherein the one or more credentials for the server comprise a set of user-defined credentials, the set of server-login input values comprise modified server-login values corresponding to each of the user-defined credentials, said determining whether the set of server-login input values authenticate the user to the server comprises comparing the modified server-login values with corresponding modified forms of user-defined credential values stored in a memory at and accessible to the server, and wherein said determining whether the set of server-login input values authenticate the user to the server is based on said comparing.

20. The server of claim 16, wherein the request from the system to authenticate the user to access the computing resource is received by the server directly from the system without passing through the client computing device as an intermediary.

21. The server of claim 15, wherein the set of user-defined credentials comprises one or more of a login, a password, an answer to a security question, a biometric, and data transmitted to the user by an independent channel.

22. The server of claim 15, wherein a modified value and its corresponding input value are related by a one-way transform function.

23. The server of claim 15, wherein the set of user-defined credentials is not known to the system, and wherein the set of input values is not known to the system.

24. The server of claim 15, wherein the set of input values is not known to the system or the server.

25. The server of claim 15, wherein the relationship between a modified value and its corresponding input value is not known to the system.

26. The server of claim 15, wherein the server is a federated server.

27. The server of claim 15, wherein the previously established credential values are stored in unmodified form only at the user computing device, and wherein the modified values have been previously provided to the server to facilitate authentication of the user by the server.

28. The server of claim 15, wherein the memory in which are stored modified forms of each of a set of user-defined credential values further stores metadata created at the user computing device, wherein the metadata specifies each user-defined credential type, and wherein the metadata has been previously sent from the user computer device to the server.

29. A method for authenticating a user, using a user computing device connected to a computer network, to access a computing resource managed by a system on the computer network, the method comprising at least the following steps performed by a combination of a runtime executable module executing at the system and a server independent of the system but in communication with the system:
   transmitting information to the user computing device to cause the user computing device to present a user interface to prompt the user to input a value for each of a set of user-defined credential values for a corresponding set of user-defined credential types, thereby forming a set of input values;
   receiving from the user computing device a set of modified values, wherein each of the modified values is generated from and represents a corresponding one of the input values; and
   validating the set of modified values by comparing them with corresponding modified forms of user-defined credential values stored in a memory accessible to one or more of the runtime executable module and the server, thereby determining whether the user is authenticated to access the computing resource on the system;
   wherein the user has previously defined the type of each of the set of user-defined credentials without being restricted to credential types predefined by the system and wherein the user has previously established the value for each of the set of user-defined credentials.

30. The method of claim 29, further comprising:
   before transmitting information to the user computing device to cause the user computing device to present the user interface, authenticating the user to the server.

31. The method of claim 30, wherein authenticating the user to the server comprises:
   transmitting information to the user computing device to cause the user computing device to present a user interface to prompt the user to input a value for each of one or more credentials for the server, thereby forming a set of server-login input values; and
   determining whether the set of server-login input values authenticate the user to the server.

32. The method of claim 31, wherein the one or more credentials for the server consist of a login ID and a password, the set of server-login input values consists of a login value and a password value entered by the user, and wherein said determining whether the set of server-login input values authenticate the user to the server comprises checking whether login value and a password value entered by the user match values stored by the server.

33. The method of claim 31, wherein the one or more credentials for the server comprise a set of user-defined credentials, the set of server-login input values comprise modified server-login values corresponding to each of the user-defined credentials, said determining whether the set of server-login input values authenticate the user to the server comprises comparing the modified server-login values with corresponding modified forms of user-defined credential values stored in a memory at and accessible to the system, and wherein said determining whether the set of server-login input values authenticate the user to the server is based on said comparing.

34. The method of claim 29, wherein the set of user-defined credentials comprises one or more credentials of the following types; a login, a password, an answer to a security question, a biometric, and data transmitted to the user by an independent channel.

35. The method of claim 29, wherein a modified value and its corresponding input value are related by a one-way transform function.

36. The method of claim 29, wherein the set of user-defined credentials is not known to the system.

37. The method of claim 29, wherein the set of input values is not known to the system and not known to the server.

38. The method of claim 29, wherein the relationship between a modified value and its corresponding input value is not known to the system.

39. The method of claim 29, wherein the server is a federated server.

40. The method of claim 29, wherein the previously established credential values are stored in unmodified form only at the user computing device, and wherein the modified values have been previously provided to the server to facilitate authentication of the user by the server.

41. The method of claim 29, wherein each user-defined credential type is specified by metadata created at the user computing device, and wherein the metadata has been previously sent from the user computer device to the server.

42. A non-transitory computer-readable medium on which are embedded instructions that, when executed by a server, authenticates a user, using a user computing device connected to a computer network, to access a computing resource managed by a system on the computer network, the system independent of server but in communication with the server, the instructions comprising:
   instructions to cause the server to receive a request from the system to authenticate the user to access the computing resource;
   instructions to cause the server to transmit information to the user computing device to cause the user computing device to present a user interface to prompt the user to input a value for each of a set of user-defined credentials, thereby forming a set of input values;
   instructions to cause the server to receive from the user computing device a set of modified values, wherein each of the modified values is generated from and represents a corresponding one of the input values;
   instructions to cause the server to validate the set of modified values by comparing them with corresponding modified forms of user-defined credential values stored in a memory at and accessible to the server; and
   instructions to cause the server, based on validating the set of modified values, to provide an indication to the system that the user has either been authenticated or not been authenticated to access the computing resource;
   wherein the user has previously defined the type of each of the set of user-defined credentials without being restricted to credential types predefined by the system and wherein the user has previously established the value for each of the set of user-defined credentials.

43. The non-transitory computer-readable medium of claim 42, further comprising:
   instructions to cause the server, in response to receiving a request from the system to authenticate the user to access the computing resource and before transmitting information to the user computing device to cause the user computing device to present the user interface, to authenticate the user to the server.

44. The non-transitory computer-readable medium of claim 43, wherein the instructions to cause the server to authenticate the user to the server comprise:
   instructions to cause the server to transmit information to the user computing device to cause the user computing device to present a user interface to prompt the user to input a value for each of one or more credentials for the server, thereby forming a set of server-login input values; and
   instructions to cause the server to determine whether the set of server-login input values authenticate the user to the server.

45. The non-transitory computer-readable medium of claim 44, wherein the one or more credentials for the server consist of a login ID and a password, the set of server-login input values consists of a login value and a password value entered by the user, and wherein said determining whether the set of server-login input values authenticate the user to the server comprises checking whether login value and a password value entered by the user match values stored by the server.

46. The non-transitory computer-readable medium of claim 44, wherein the one or more credentials for the server comprise a set of user-defined credentials, the set of server-login input values comprise modified server-login values corresponding to each of the user-defined credentials, said determining whether the set of server-login input values authenticate the user to the server comprises comparing the modified server-login values with corresponding modified forms of user-defined credential values stored in a memory at and accessible to the system, and wherein said determining whether the set of server-login input values authenticate the user to the server is based on said comparing.

47. The non-transitory computer-readable medium of claim 42, wherein the set of user-defined credentials comprises one or more credentials of the following types; a login, a password, an answer to a security question, a biometric, and data transmitted to the user by an independent channel.

48. The non-transitory computer-readable medium of claim 42, wherein a modified value and its corresponding input value are related by a one-way transform function.

49. The non-transitory computer-readable medium of claim 42, wherein the set of user-defined credentials is not known to the system.

50. The non-transitory computer-readable medium of claim 42, wherein the set of input values is not known to the system and not known to the server.

51. The non-transitory computer-readable medium of claim 42, wherein the relationship between a modified value and its corresponding input value is not known to the system.

52. The non-transitory computer-readable medium of claim 42, wherein the server is a federated server.

53. The non-transitory computer-readable medium of claim 42, wherein the previously established credential values are stored in unmodified form only at the user computing device, and wherein the modified values have been previously provided to the server to facilitate authentication of the user by the server.

54. The non-transitory computer-readable medium of claim 42, wherein the request from the system to authenticate the user to access the computing resource is received at the server directly from the system without passing through the client computing device as an intermediary.

55. The non-transitory computer-readable medium of claim 42, wherein each user-defined credential type is specified by metadata created at the user computing device, and wherein the metadata has been previously sent from the user computer device to the server.

* * * * *